United States Patent
Torii

(10) Patent No.: US 11,531,508 B2
(45) Date of Patent: Dec. 20, 2022

(54) DATA PROCESSING DEVICE, DISPLAY SYSTEM, AND DATA PROCESSING METHOD THAT CONTROLS THE OUTPUT OF DATA BASED ON A CONNECTION STATE

(71) Applicant: SEIKO EPSON CORPORATION, Tokyo (JP)

(72) Inventor: Shinya Torii, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/131,859

(22) Filed: Dec. 23, 2020

(65) Prior Publication Data
US 2021/0200496 A1 Jul. 1, 2021

(30) Foreign Application Priority Data
Dec. 26, 2019 (JP) .............................. JP2019-235480

(51) Int. Cl.
| | |
|---|---|
| *G06F 3/14* | (2006.01) |
| *G06F 13/42* | (2006.01) |
| *G02B 27/01* | (2006.01) |
| *G01D 21/02* | (2006.01) |
| *H04N 5/247* | (2006.01) |
| *G09G 3/3208* | (2016.01) |

(52) U.S. Cl.
CPC .......... *G06F 3/1423* (2013.01); *G01D 21/02* (2013.01); *G02B 27/0172* (2013.01); *G06F 13/4282* (2013.01); *G02B 2027/014* (2013.01); *G02B 2027/0178* (2013.01); *G06F 2213/0042* (2013.01); *G09G 3/3208* (2013.01); *H04N 5/247* (2013.01)

(58) Field of Classification Search
CPC ..................................................... G06F 3/1423
See application file for complete search history.

(56) References Cited

U.S. PATENT DOCUMENTS

| | | | |
|---|---|---|---|
| 2016/0049012 A1* | 2/2016 | Torii ..................... | G01C 21/206 345/633 |
| 2017/0132406 A1* | 5/2017 | Torii ..................... | G06F 21/6209 |
| 2017/0153672 A1* | 6/2017 | Shin ..................... | G02B 27/0176 |
| 2017/0315938 A1* | 11/2017 | Mori ..................... | G06F 9/4411 |
| 2019/0197989 A1 | 6/2019 | Kimura | |

FOREIGN PATENT DOCUMENTS

JP          2019-114049 A          7/2019

\* cited by examiner

*Primary Examiner* — William Boddie
*Assistant Examiner* — Andrew B Schnirel
(74) *Attorney, Agent, or Firm* — Oliff PLC

(57) ABSTRACT

A sensor data providing unit included in a control device provides, when an HMD is connected, detection data acquired by a sensor driver as standard sensor data, and continues an operation of acquiring detection data of a first sensor by the sensor driver, and provides, when the HMD is not connected, detection data acquired by a built-in sensor driver as standard sensor data.

9 Claims, 10 Drawing Sheets

DATA PROCESSING DEVICE, DISPLAY SYSTEM, AND DATA PROCESSING METHOD THAT CONTROLS THE OUTPUT OF DATA BASED ON A CONNECTION STATE

The present application is based on, and claims priority from JP Application Serial Number 2019-235480, filed Dec. 26, 2019, the disclosure of which is hereby incorporated by reference herein in its entirety.

BACKGROUND

1. Technical Field

The present disclosure relates to a data processing device, a display system, and a data processing method.

2. Related Art

In the related art, a technology for switching and using a sensor included in a terminal device and a sensor included in a display device when the terminal device including the sensor is connected to the display device including the sensor has been known (for example, see JP-A-2019-114049). In a system described in JP-A-2019-114049, when a user who uses a display device performs a switching instruction, processing of using sensor data from a sensor included in a terminal device and processing of using sensor data from a sensor included in the display device are switched.

In the configuration described in JP-A-2019-114049, the terminal device and the display device are detachable. In such a configuration, it has been desired to perform switching according to presence or absence of a connection of the display device even without the user instructing the switching.

SUMMARY

One aspect for solving the problem described above is a data processing device including a first sensor, a connection unit connected to a display device, the display device including a second sensor and a display unit; an application execution unit configured to execute an application that uses detection data of a sensor, and a sensor data providing unit configured to provide detection data of a first standard sensor to the application execution unit, wherein the sensor data providing unit includes a first data acquisition unit configured to acquire detection data of the first sensor, and a second data acquisition unit configured to acquire detection data of the second sensor, when the display device is connected to the connection unit, the detection data acquired by the second data acquisition unit is provided as detection data of the first standard sensor, and an operation of acquiring detection data of the first sensor by the first data acquisition unit is continued, and, when the display device is not connected to the connection unit, the detection data acquired by the first data acquisition unit is provided as detection data of the first standard sensor.

Another aspect for solving the problem described above is a display system including a data processing device including a first sensor, and a display device including a second sensor and a display unit, wherein the data processing device includes a connection unit connected to the display device, an application execution unit configured to execute an application that uses detection data of a sensor, and a sensor data providing unit configured to provide detection data of a first standard sensor to the application execution unit, the application execution unit executes the application configured to output, to the display device, display data displayed by the display unit and display control data for controlling display of the display unit, the sensor data providing unit includes a first data acquisition unit configured to acquire detection data of the first sensor, and a second data acquisition unit configured to acquire detection data of the second sensor, when the display device is connected to the connection unit, the detection data acquired by the second data acquisition unit is provided as detection data of the first standard sensor, and an operation of acquiring detection data of the first sensor by the first data acquisition unit is continued, when the display device is not connected to the connection unit, the detection data acquired by the first data acquisition unit is provided as detection data of the first standard sensor, and the display device performs display on the display unit according to the display data or the display control data input from the data processing device.

Still another aspect for solving the problem described above is a data processing method using a data processing device including a first sensor, and a display device including a second sensor and a display unit, and is the data processing method including, by the data processing device, executing an application that uses detection data of a sensor, providing detection data of a first standard sensor to the application, based on data acquired by a first data acquisition unit configured to acquire detection data of the first sensor and data acquired by a second data acquisition unit configured to acquire detection data of the second sensor, providing, when the display device is connected to the data processing device, the detection data acquired by the second data acquisition unit as detection data of the first standard sensor, and continuing an operation of acquiring detection data of the first sensor by the first data acquisition unit, and providing, when the display device is not connected to the data processing device, the detection data acquired by the first data acquisition unit as detection data of the first standard sensor.

DESCRIPTION OF EXEMPLARY EMBODIMENTS

1. Configuration of Display System

Exemplary embodiments to which the present disclosure is applied are described below with reference to the accompanying drawings.

Figure 1:
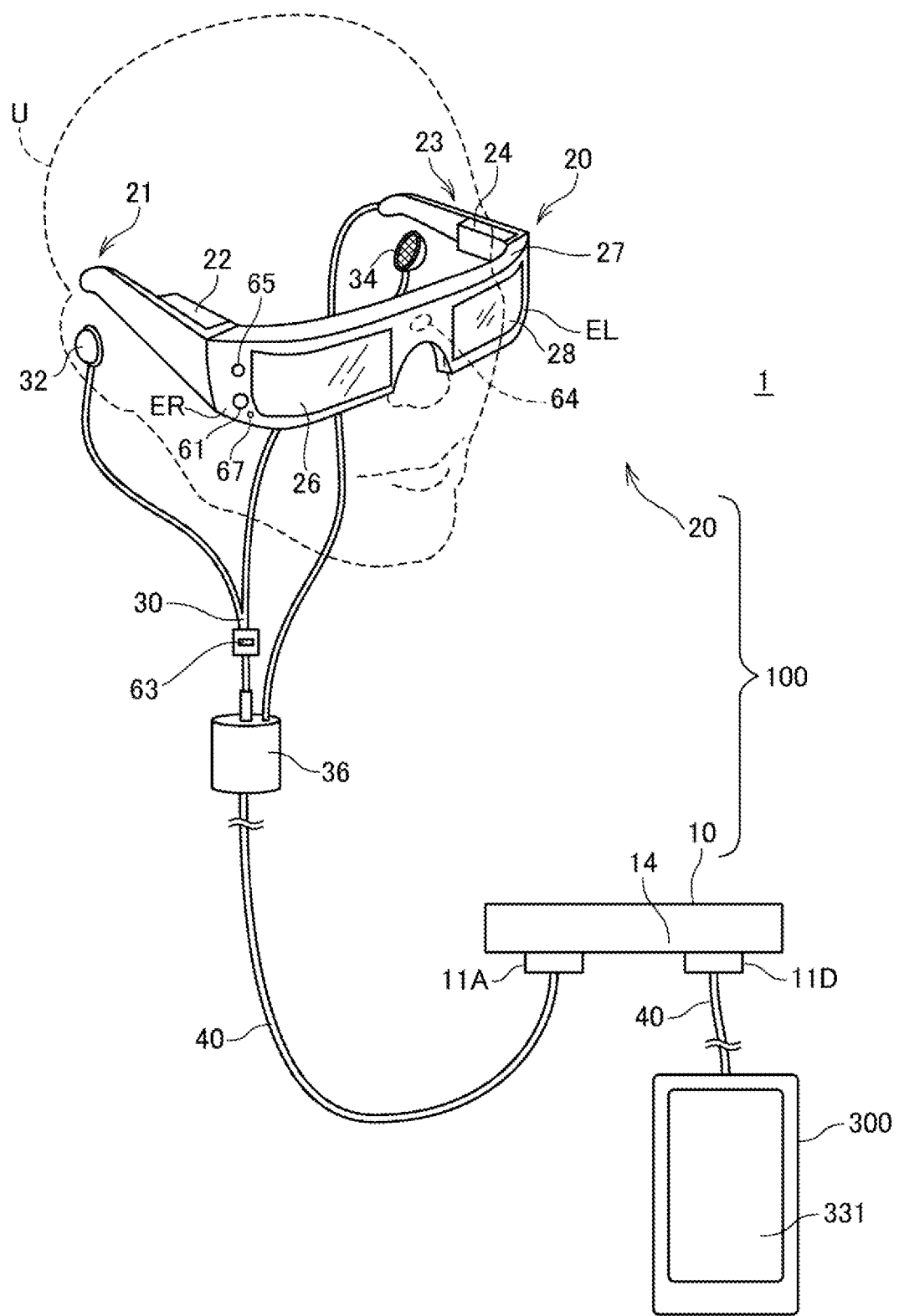
FIG. 1 is a diagram illustrating a schematic configuration of a display system.

FIG. 1 is a diagram illustrating a schematic configuration of a display system 1.

The display system 1 includes an HMD 100 and a control device 300. The HMD 100 is a head-mounted display apparatus that includes an image display unit 20 mounted on a head of a user U to allow the user to visually recognize an image and video. HMD is an abbreviation for Head Mounted Display.

The HMD 100 includes a connection device 10 connected to the image display unit 20. The connection device 10 functions as an interface for connecting the HMD 100 to a device different from the HMD 100. In the display system 1, the control device 300 is connected to the connection device 10.

In the following description and drawings, for convenience of description, a name of some functional units constituting the HMD 100 is denoted by a prefix DP, and a name of some functional units constituting the control device 300 is denoted by a prefix CO.

The control device 300 is a terminal device in a portable size including an LCD 331 configured to display a character and an image, and a smartphone, for example, can be used. LCD is an abbreviation for Liquid Crystal Display. The control device 300 corresponds to an example of a data processing device of the present disclosure, and the display system 1 may include a device of another type as a data processing device. For example, the data processing device may be a desktop personal computer, a notebook personal computer, a tablet personal computer, and the like.

The connection device 10 includes a connector 11A and a connector 11D in a box-shaped case. The image display unit 20 is connected to the connector 11A via a connection cable 40, and the control device 300 is connected to the connector 11D via a USB cable 46. In this way, the image display unit 20 and the control device 300 are connected to each other so as to be able to transmit and receive data to and from each other. For example, the control device 300 outputs, to the image display unit 20, video data for the image display unit 20 to display video, and sound data. For example, the image display unit 20 transmits detection data of various sensors included in the image display unit 20 to the control device 300, as described below. Furthermore, the control device 300 may be able to supply power to the image display unit 20. USB is an abbreviation for Universal Serial Bus.

The configuration of connecting the connection device 10 and the control device 300 by using the USB cable 46 is merely an example, and a specific connection form of the connection device 10 and the control device 300 is not limited. For example, a cable of another type may be used for a connection in a wired manner, or a connection may be made via wireless communication. For example, in a configuration in which the USB cable 46 is connected to the connector 11D of a USB-Type C standard, a direct current of 20 volts can be supplied by the USB cable 46, and video data of an HDMI standard and the like can be transmitted as a function of an alternate mode of the USB-Type C. HDMI and MHL are a registered trademark.

The image display unit 20 includes a main body including a right holding part 21, a left holding part 23, and a front frame 27. The main body further includes a right display unit 22, a left display unit 24, a right light-guiding plate 26, and a left light-guiding plate 28. The image display unit 20 corresponds to an example of a display unit of the present disclosure.

The right holding part 21 and the left holding part 23 extend rearward from corresponding ends of the front frame 27, and hold the image display unit 20 on the head of the user U. The right holding part 21 is coupled to an end part ER located on the right side of the user U in the front frame 27, and the left holding part 23 is coupled to an end part EL located on the left side of the user U.

The right light-guiding plate 26 and the left light-guiding plate 28 are provided on the front frame 27. The right light-guiding plate 26 is located in front of the right eye of the user U in a state where the user U wears the image display unit 20, and causes the user U to visually recognize an image with the right eye. The left light-guiding plate 28 is located in front of the left eye of the user U in a state where the user U wears the image display unit 20, and causes the user U to visually recognize an image with the left eye. The right light-guiding plate 26 and the left light-guiding plate 28 are optical parts formed of a light transmissive resin or the like, and are configured to guide imaging light output by the right display unit 22 and the left display unit 24 to the eyes of the user U. The right light-guiding plate 26 and the left light-guiding plate 28 are, for example, prisms.

The front frame 27 has a shape formed by coupling an end of the right light-guiding plate 26 and an end of the left light-guiding plate 28 to each other, and this coupling position corresponds to a position between eyebrows of the user U in a state where the user U wears the image display unit 20. The front frame 27 may include a nose pad part configured to abut the nose of the user U in the state where the user U wears the image display unit 20, and may be configured to couple the belt to the right holding part 21 and the left holding part 23 to hold the image display unit 20 on the head of the user U by the belt.

Each of the right display unit 22 and the left display unit 24 is a module acquired by unitizing an optical unit and a peripheral circuit. The right display unit 22 displays an image by the right light-guiding plate 26, and the left display unit 24 displays an image by the left light-guiding plate 28. The right display unit 22 is provided on the right holding part 21, and the left display unit 24 is provided on the left holding part 23.

The imaging light guided by the right light-guiding plate 26 and the outside light transmitted through the right light-guiding plate 26 are incident on the right eye of the user U. Similarly, the imaging light guided by the left light-guiding plate 28 and the outside light transmitted through the left light-guiding plate 28 are incident on the left eye. The imaging light from the right light-guiding plate 26 and the left light-guiding plate 28 and the outside light transmitted through the right light-guiding plate 26 and the left light-guiding plate 28 are incident on the eye of the user U. In this way, the user U visually recognizes an image displayed by the image display unit 20 overlapping an outside scene transmitted through the right light-guiding plate 26 and the left light-guiding plate 28.

A DP illuminance sensor 65 is arranged on the front frame 27. The DP illuminance sensor 65 is a sensor configured to receive the outside light coming from the front of the user U wearing the image display unit 20. The DP illuminance sensor 65 can detect illuminance and the amount of the outside light that is transmitted through the right light-guiding plate 26 and the left light-guiding plate 28 and is incident on the eye of the user U.

A DP outer camera 61 is provided on the front frame 27 and positioned such that the DP outer camera 61 does not block the outside light transmitted through the right light-guiding plate 26 and the left light-guiding plate 28. The DP outer camera 61 is a digital camera including an imaging element such as a CCD and a CMOS, an image capturing lens, and the like, and may be a monocular camera or a stereo camera. An angle of view of the DP outer camera 61 includes at least a part of a range of the outside scene visually recognized by the user U wearing the image display unit 20 through the right light-guiding plate 26 and the left light-guiding plate 28. The DP outer camera 61 may be a wide angle camera and may be able to capture the entire outside scene visually recognized by the user U wearing the image display unit 20. CCD is an abbreviation for Charge Coupled Device, and CMOS is an abbreviation for Complementary Metal Oxide Semiconductor.

An LED indicator 67 configured to turn on during an operation of the DP outer camera 61 is disposed on the front frame 27.

A distance sensor 64 configured to detect a distance to a measurement target object located in a preset measurement direction is provided on the front frame 27. The distance sensor 64 is, for example, a light reflective distance sensor using an LED, a laser diode, or the like, an infrared depth sensor, an ultrasonic distance sensor, or a laser range scanner. The distance sensor 64 may be a distance detection unit combining image detection and sound detection, or a device configured to process an image acquired by stereo imaging by a camera and detect a distance. A measurement direction of the distance sensor 64 is, for example, a direction of the outside scene visually recognized by the user U through the right light-guiding plate 26 and the left light-guiding plate 28.

Each of the right display unit 22 and the left display unit 24 is connected to the connection device 10 via the connection cable 40. The connection cable 40 includes an audio connector 36. A headset 30 including a right earphone 32 and a left earphone 34 constituting a stereo headphone, and a microphone 63 is connected to the audio connector 36. The right earphone 32 and the left earphone 34 output a sound based on a sound signal output from the connection device 10. The microphone 63 is configured to collect a sound and output the sound signal to the connection device 10.

2. Configuration of Optical System of Image Display Unit

Figure 2:
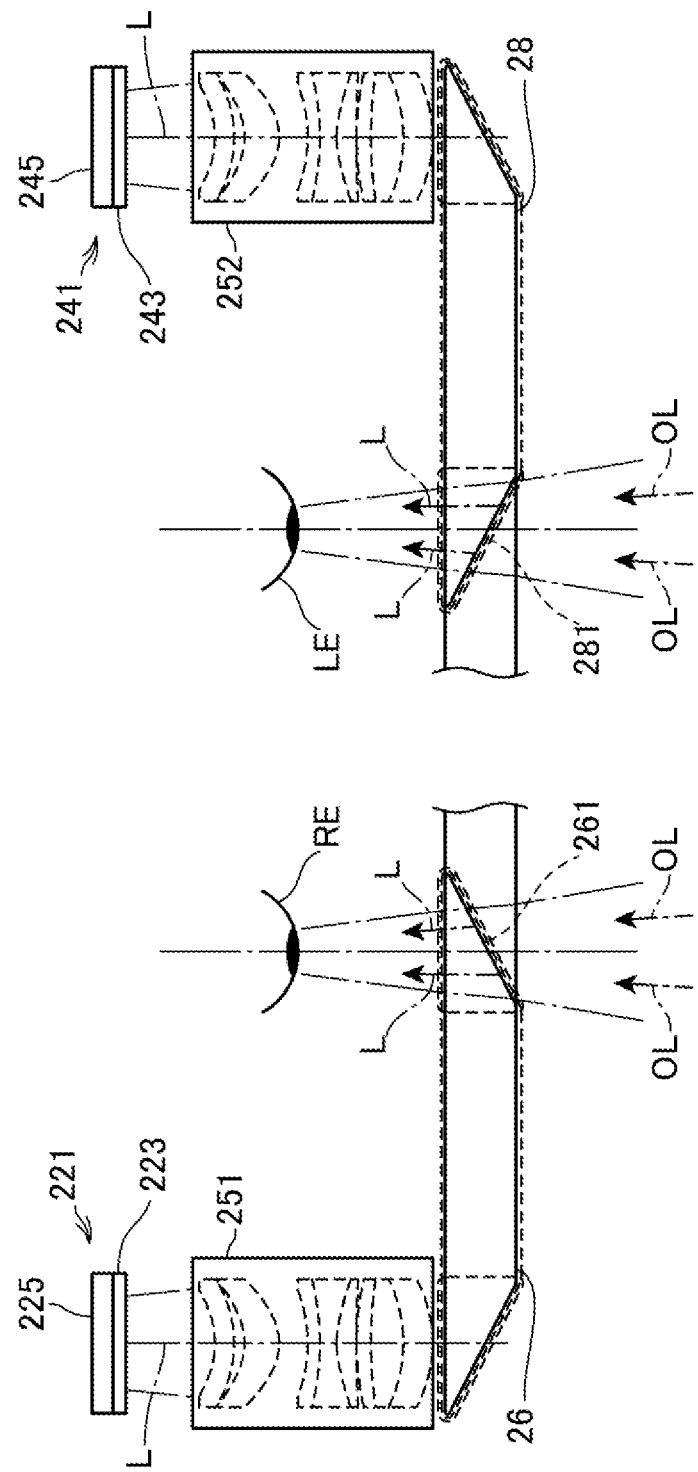
FIG. 2 is a plan view of a main part illustrating a configuration of an optical system of an image display unit.

FIG. 2 is a plan view of a main part illustrating a configuration of an optical system of the image display unit 20. In FIG. 2, a left eye LE and a right eye RE of the user U are illustrated for description.

The right display unit 22 and the left display unit 24 are configured to be left-right symmetrical, for example.

As a configuration that causes the right eye RE to visually recognize an image, the right display unit 22 includes an OLED unit 221 configured to emit imaging light, and a right optical system 251 configured to guide imaging light L emitted by the OLED unit 221 toward the right light-guiding plate 26. OLED is an abbreviation for Organic Light Emitting Diode.

Figure 3:
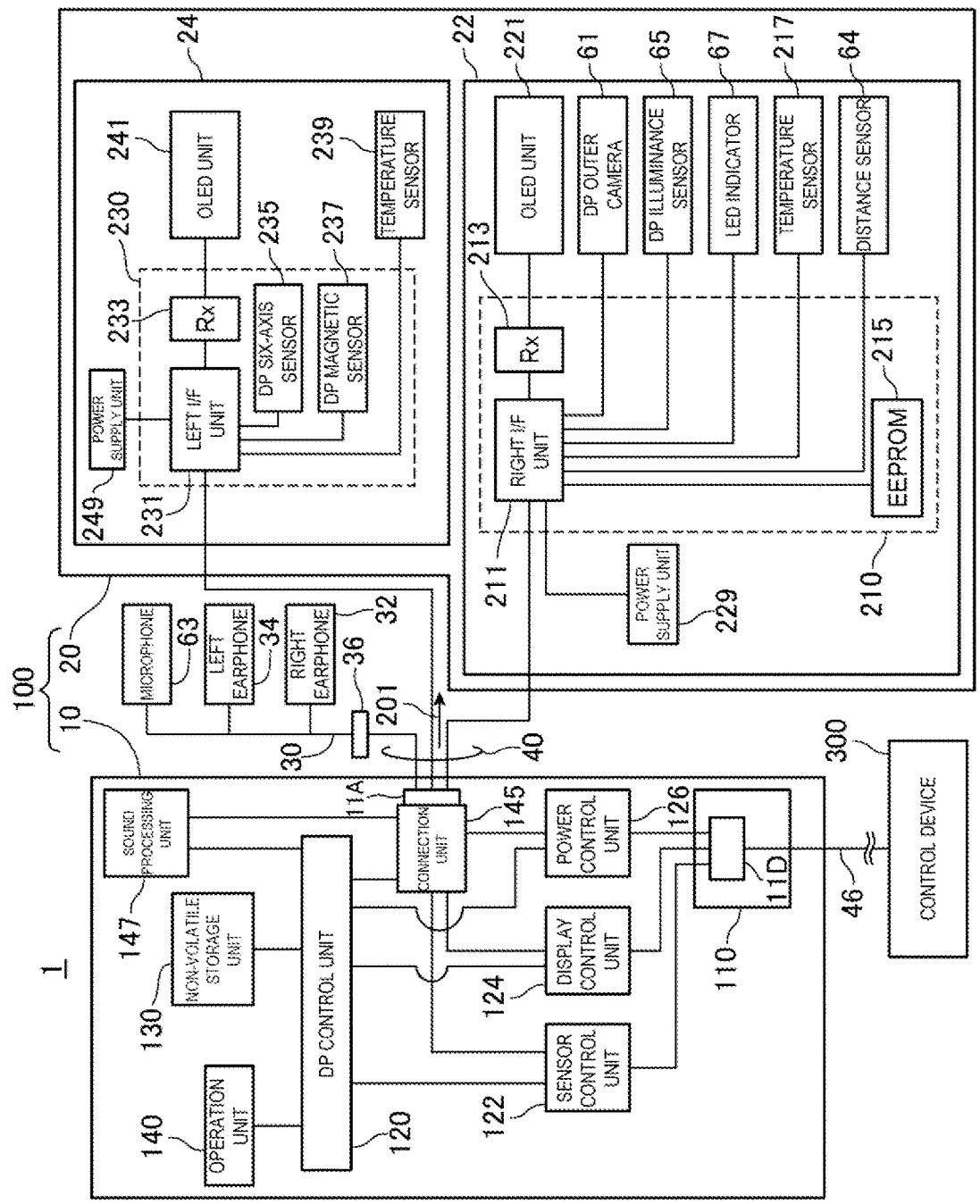
FIG. 3 is a block diagram of the display system.

The OLED unit 221 includes an OLED panel 223 and an OLED driving circuit 225 configured to drive the OLED panel 223. The OLED panel 223 is a self-light emission type display panel including light-emitting elements configured to emit color light of R, color light of G, and color light of B, respectively. The OLED driving circuit 225 drives the OLED panel 223 according to control of a DP control unit 120. The OLED driving circuit 225 is mounted on a substrate (not illustrated) fixed to a rear face of the OLED panel 223, for example, and a temperature sensor 217 illustrated in FIG. 3 is mounted on the substrate.

The right optical system 251 collimates the imaging light L emitted from the OLED panel 223 into a beam of light in a parallel state by a collimate lens, and causes the beam of light to enter the right light-guiding plate 26. The imaging light L is reflected by a plurality of reflection surfaces in the right light-guiding plate 26, and is reflected by a half mirror 261 located in front of the right eye RE and emitted from the right light-guiding plate 26 toward the right eye RE.

As a configuration that causes the left eye LE to visually recognize an image, the left display unit 24 includes an OLED unit 241 configured to emit imaging light, and a left optical system 252 configured to guide the imaging light L emitted by the OLED unit 241 toward the left light-guiding plate 28.

The OLED unit 241 includes an OLED panel 243, and an OLED driving circuit 245 configured to drive the OLED panel 243. The OLED panel 243 is a self-light emission type display panel including light-emitting elements configured to emit color light of R, color light of G, and color light of B, respectively. The OLED driving circuit 245 drives the OLED panel 243 according to control of the DP control unit 120. The OLED driving circuit 245 is mounted on a substrate (not illustrated) fixed to a rear face of the OLED panel 243, for example, and a temperature sensor 239 illustrated in FIG. 3 is mounted on the substrate.

The left optical system 252 collimates the imaging light L emitted from the OLED panel 243 into a beam of light in a parallel state by a collimate lens, and causes the beam of light to enter the left light-guiding plate 28. The imaging light L is reflected by a plurality of reflection surfaces in the left light-guiding plate 28, and is reflected by a half mirror 261 located in front of the left eye LE and emitted from the left light-guiding plate 28 toward the left eye LE.

The HMD 100 functions as a transmissive display device. In other words, the imaging light L reflected by the half mirror 261 and outside light OL transmitted through the right light-guiding plate 26 enter the right eye RE of the user U. The imaging light L reflected by the half mirror 281 and the outside light OL transmitted through the half mirror 281 enter the left eye LE. The HMD 100 superimposes the imaging light L of an internally processed image and the outside light OL on each other, and causes the imaging light L and the outside light OL to enter the eyes of the user U. Thus, the user U can see an outside scene through the right light-guiding plate 26 and the left light-guiding plate 28. The image by the imaging light L superimposed on the outside scene is visually recognized. Each of the half mirrors 261 and 281 is an image extracting unit configured to reflect imaging light output by each of the right display unit 22 and the left display unit 24 and extract an image, and constitutes the display unit.

3. Control System of HMD

FIG. 3 is a block diagram of the display system 1, and particularly illustrates the configuration of the HMD 100 in detail.

In the image display unit 20, the right display unit 22 includes a right display unit substrate 210. On the right display unit substrate 210, a right I/F unit 211 connected to the connection cable 40, a reception unit 213 configured to receive data input from the connection device 10 via the right I/F unit 211, and an EEPROM 215 are mounted. The right I/F unit 211 connects the reception unit 213, the EEPROM 215, the temperature sensor 217, the DP outer camera 61, the distance sensor 64, the DP illuminance sensor 65, and the LED indicator 67 to the connection device 10. The reception unit 213 connects the OLED unit 221 to the connection device 10.

The left display unit 24 includes a left display unit substrate 230. On the left display unit substrate 230, a left I/F unit 231 connected to the connection cable 40, a reception unit 233 configured to receive data input from the connection device 10 via the left I/F unit 231 are mounted. The left display unit substrate 230 is mounted with a DP six-axis sensor 235 and a DP magnetic sensor 237.

The left I/F unit 231 connects the reception unit 233, the DP six-axis sensor 235, the DP magnetic sensor 237, and the temperature sensor 239 to the connection device 10. The reception unit 233 connects the OLED unit 241 to the connection device 10.

I/F is an abbreviation for interface in the description and drawings of the present exemplary embodiment. EEPROM is an abbreviation for Electrically Erasable Programmable Read-Only Memory. Further, the reception unit 213 and the reception unit 233 may be described as Rx 213 and Rx 233, respectively.

The EEPROM 215 stores various types of data in a non-volatile manner. The EEPROM 215 stores, for example, data about light-emitting properties and display properties of the OLED units 221 and 241 provided in the image display unit 20, and data about a property of a sensor provided in the right display unit 22 or the left display unit 24. Specifically, the EEPROM 215 stores parameters regarding gamma correction of the OLED units 221 and 241, data used to compensate for detection values of the temperature sensors 217 and 239, and the like in a manner readable by the DP control unit 120.

The DP outer camera 61 captures an image in accordance with a signal input via the right I/F unit 211, and outputs captured imaging data to the right I/F unit 211. The DP illuminance sensor 65 receives the outside light, and outputs a detection value corresponding to the amount of the received light or an intensity of the received light. The LED indicator 67 turns on in accordance with a control signal or a driving current input via the right I/F unit 211.

The temperature sensor 217 detects a temperature of the OLED unit 221, and outputs a voltage value or a resistance value corresponding to the detected temperature as a detection value.

The distance sensor 64 is configured to output a signal indicating detection results of detecting a distance to the connection device 10 via the right I/F unit 211.

The reception unit 213 receives video data for display transmitted from the connection device 10 via the right I/F unit 211, and outputs the video data to the OLED unit 221. The OLED unit 221 displays video based on the video data transmitted by the connection device 10.

Further, the reception unit 233 receives video data for display transmitted from the connection device 10 via the left I/F unit 231, and outputs the video data to the OLED unit 241. The OLED units 221 display video based on the video data transmitted by the connection device 10.

The DP six-axis sensor 235 is a motion sensor including a three-axis acceleration sensor and a three-axis gyro sensor. The DP magnetic sensor 237 is a three-axis geomagnetic sensor, for example. The DP six-axis sensor 235 and the DP magnetic sensor 237 may be an IMU in which each of the sensors described above is formed in a module, and the DP six-axis sensor 235 and the DP magnetic sensor 237 may be an integrated module. IMU is an abbreviation for Inertial Measurement Unit. The temperature sensor 239 detects the temperature of the OLED unit 241. The DP six-axis sensor 235, the DP magnetic sensor 237, and the temperature sensor 239 each output a detection value to the connection device 10.

Each component of the image display unit 20 operates with power supplied from the connection device 10 via the connection cable 40. The image display unit 20 includes a power supply unit 229 on the right display unit 22, and a power supply unit 249 on the left display unit 24. The power supply unit 229 distributes and supplies the power supplied by the connection device 10 via the connection cable 40 to each component of the right display unit 22 including the right display unit substrate 210. The power supply unit 249 distributes and supplies the power supplied by the connection device 10 via the connection cable 40 to each component of the left display unit 24 including the left display unit substrate 230. The power supply units 229 and 249 may include a conversion circuit or the like configured to convert a voltage.

The connection device 10 includes an I/F unit 110, a DP control unit 120, a sensor control unit 122, a display control unit 124, a power control unit 126, a non-volatile storage unit 130, an operation unit 140, a connection unit 145, and a sound processing unit 147.

The I/F unit 110 includes the connector 11D, and an interface circuit configured to execute a communication protocol conforming to various communication standards by the connector 11D. The I/F unit 110 is, for example, an interface substrate on which the connector 11D and the interface circuit are mounted. The I/F unit 110 may include an interface for a memory card capable of connecting an external storage device or an external storage medium, or the like, or the I/F unit 110 may include a radio communication interface.

The DP control unit 120 includes a processor such as a CPU and a microcomputer, and the processor controls each component of the connection device 10 by executing a program. The DP control unit 120 may include a RAM constituting a work area for the processor. RAM is an abbreviation for Random Access Memory.

The non-volatile storage unit 130, the operation unit 140, the connection unit 145, and the sound processing unit 147 are connected to the DP control unit 120. The non-volatile storage 130 is a ROM configured to store a program and data to be executed by the DP control unit 120 in a non-volatile manner. ROM is an abbreviation for Read Only Memory.

The sensor control unit 122 operates each sensor included in the image display unit 20. Here, each sensor refers to each of the DP outer camera 61, the distance sensor 64, the DP illuminance sensor 65, the temperature sensor 217, the DP six-axis sensor 235, the DP magnetic sensor 237, and the temperature sensor 239. Each sensor includes at least one or more of the DP outer camera 61, the DP illuminance sensor 65, the DP six-axis sensor 235, and the DP magnetic sensor 237. The sensor control unit 122 performs setting and initialization of a sampling period of each sensor according to control of the DP control unit 120, and executes energization to each sensor, transmission of control data, acquisition of detection values, and the like, in correspondence to the sampling period of each sensor.

The sensor control unit 122 outputs detection data indicating a detection value and a detection result of each sensor to the I/F unit 110 at a preset timing. Here, captured imaging data of the DP outer camera 61 is referred to as detection data similarly to a detection value and a detection result of the other sensors.

The sensor control unit 122 may include an A/D converter configured to convert an analog signal into digital data. In this case, the sensor control unit 122 converts an analog signal of a detection value and a detection result acquired from the sensor of the image display unit 20 into detection data, and outputs the detection data. Further, the sensor control unit 122 may acquire digital data of a detection value and a detection result from the sensor of the image display unit 20, perform conversion of a data format, adjustment of an output timing, and the like, and then output detection data to the I/F unit 110.

By the operation of the sensor control unit 122, the control device 300 connected to the I/F unit 110 can acquire a detection value of each sensor of the HMD 100 and captured imaging data of the DP outer camera 61.

The sensor control unit 122 may output, as detection data, a result acquired by an arithmetic operation based on the detection value of each sensor described above. For example, the sensor control unit 122 may integrally process detection values and detection results of a plurality of sensors, and function as a so-called sensor fusion processing unit. In this case, the sensor control unit 122 may generate detection data of a virtual sensor that is not included in each sensor of the image display unit 20 by the sensor fusion. For example, the sensor control unit 122 may output, as detection data, trajectory data indicating a trajectory in which the image display unit 20 moves, coordinate data indicating a position of the image display unit 20 in a three-dimensional space, and direction data indicating a direction of the image display unit 20. Here, the coordinate data may be data indicating relative coordinates with reference to a position of the connection device 10, or may be data indicating a position with respect to a reference position set in a space in which the image display unit 20 is present. The direction data may be data indicating a direction with reference to a position and a direction of the connection device 10, or may be data indicating a direction with respect to a reference position set in the space in which the image display unit 20 is present.

The sensor control unit 122 executes a communication protocol between a device connected to the connector 11D via the USB cable 46 and the sensor control unit 122, and outputs detection data.

The display control unit 124 executes various kinds of processing for the image display unit 20 to display an image based on video data or display data input to the I/F unit 110. In the present exemplary embodiment, video data is transmitted in the alternate mode of the USB-Type C through the connector 11D formed of the USB-Type C connector. For example, the display control unit 124 executes various kinds of processing such as cutting out of a frame, resolution conversion, scaling, intermediate frame generation, and frame rate conversion. The display control unit 124 outputs video data corresponding to each of the OLED units 221 and 241 to the connection unit 145. The video data input to the connection unit 145 are transmitted as a video signal 201 from the connector 11A to the right I/F unit 211 and the left I/F unit 231. Further, the display control unit 124 adjusts and changes a display state of the image display unit 20 according to display control data input to the I/F unit 110.

The sensor control unit 122 and/or the display control unit 124 may be realized by cooperation of software and hardware by a processor executing a program. In other words, the sensor control unit 122 and the display control unit 124 are formed of a processor, and executes the operation described above by executing a program. In this example, the sensor control unit 122 and the display control unit 124 may be realized by a processor constituting the DP control unit 120 executing a program. In other words, the processor may function as the DP control unit 120, the display control unit 124, and the sensor control unit 122 by executing the program. Here, the processor can be paraphrased as a computer. Each of the sensor control unit 122 and the display control unit 124 may include a work memory for executing data processing, and may execute processing by using a memory of the DP control unit 120.

The display control unit 124 and the sensor control unit 122 may be formed of programmed hardware such as a DSP and an FPGA. Further, the sensor control unit 122 and the display control unit 124 may be integrated to be configured as an SoC-FPGA. DSP is an abbreviation for Digital Signal Processor, FPGA is an abbreviation for Field Programmable Gate Array, and SoC is an abbreviation for System-on-a-Chip.

The power control unit 126 is a circuit connected to the connector 11D, and configured to, based on power supplied from the connector 11D, supply power to each component of the connection device 10 and to the image display unit 20.

The operation unit 140 detects an operation on a switch and the like included in the connection device 10, and outputs data indicating an operation content to the DP control unit 120.

The sound processing unit 147 generates a sound signal according to sound data that are input from the DP control unit 120, and outputs the sound signal to the connection unit 145. This sound signal is output from the connection unit 145 to the right earphone 32 and the left earphone 34 via the audio connector 36. The sound processing unit 147 generates sound data of the sound collected by the microphone 63, and outputs the sound data to the DP control unit 120. The voice data output from the sound processing unit 147 may be processed by the sensor control unit 122 similarly to the detection data of the sensor included in the image display unit 20.

4. Configuration of Control Device

Figure 4:
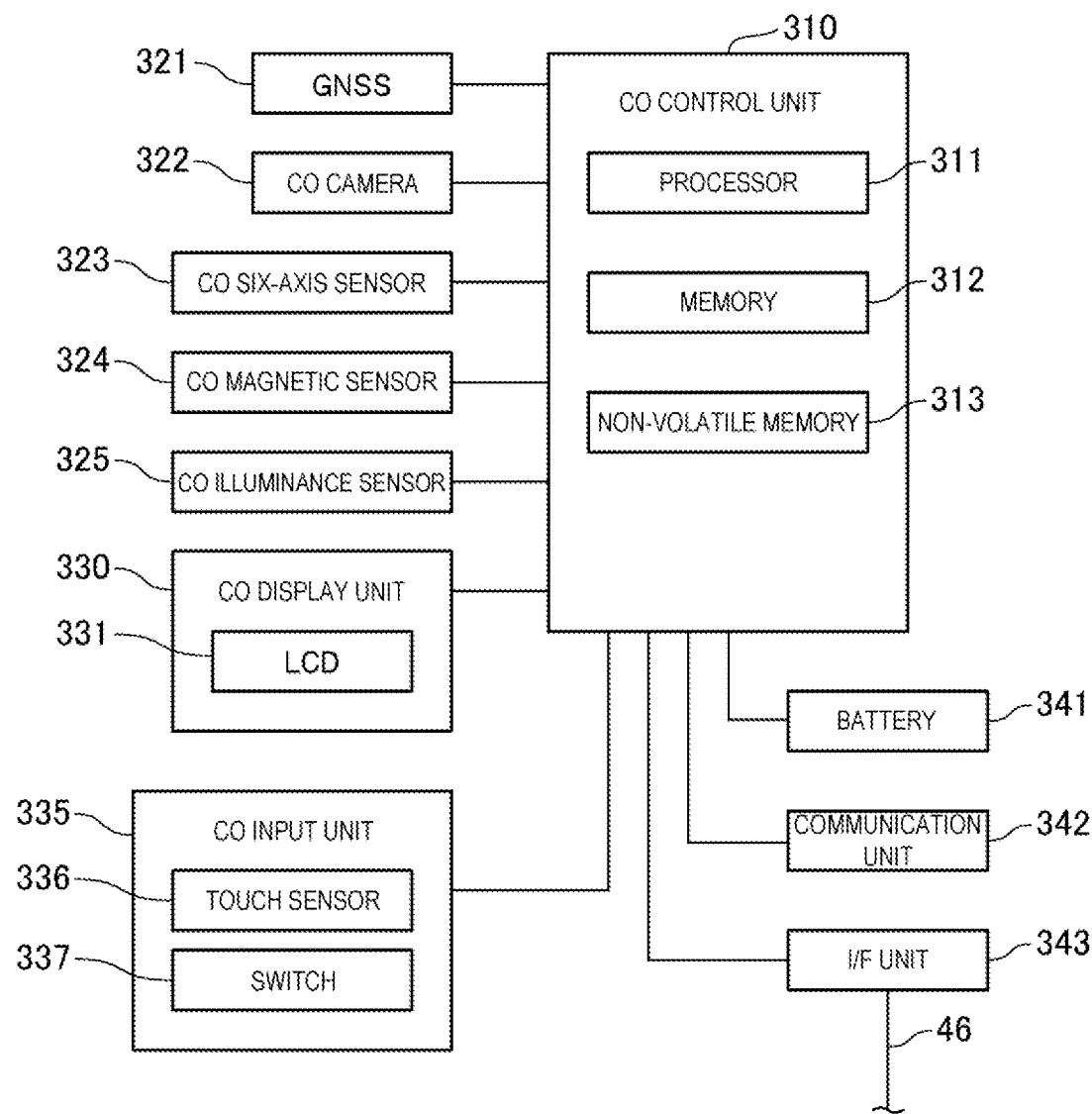
FIG. 4 is a block diagram of a control device.

FIG. 4 is a block diagram of the control device 300.

The control device 300 includes a CO control unit 310. The CO control unit 310 includes a processor 311, a memory 312, and a non-volatile memory 313. The processor 311 is formed of a CPU, a microcomputer, a DSP, and the like, and controls each component of the control device 300 by executing a program. The memory 312 forms a work area of the processor 311. The non-volatile memory 313 is formed of a semiconductor memory device and the like, and stores a program executed by the processor 311 and various types of data to be processed by the processor 311 in a non-volatile manner. For example, the non-volatile memory 313 stores an operating system as a basic control program to be executed by the processor 311, an application program operating on the operating system, and the like. The non-volatile memory 313 also stores data to be processed during execution of an application program and data about a processing result. The operating system is abbreviated as OS below.

The CO control unit 310 may be an SoC in which the processor 311, the memory 312, and the non-volatile memory 313 are integrated.

A GNSS 321, a CO camera 322, a CO six-axis sensor 323, a CO magnetic sensor 324, a CO illuminance sensor 325, a CO display unit 330, and a CO input unit 335 are connected to the CO control unit 310.

The GNSS 321 performs positioning by using the satellite positioning system, and outputs a position of the control device 300 to the CO control unit 310. GNSS is an abbreviation for Global Navigation Satellite System.

The CO camera 322 is a digital camera provided on the main body of the control device 300, and, for example, is disposed adjacent to an LCD 331 and captures a direction opposite to the LCD 331. The CO camera 322 captures an image according to control by the CO control unit 310, and outputs captured imaging data to the CO control unit 310.

The CO six-axis sensor 323 is a motion sensor including a three-axis acceleration sensor and a three-axis gyro sensor, and outputs detection data indicating a detection value to the CO control unit 310. The CO magnetic sensor 324 is, for example, a three-axis magnetic field sensor, and outputs detection data indicating a detection value to the CO control unit 310. The CO six-axis sensor 323 and the CO magnetic sensor 324 may be an IMU in which each of the sensors described above is formed in a module, and the CO six-axis sensor 323 and the CO magnetic sensor 324 may be an integrated module.

The CO illuminance sensor 325 receives the outside light, and outputs detection data indicating a detection value corresponding to the amount of the received light or an intensity of the received light.

The CO display unit 330 includes the LCD 331, and displays a character and an image on the LCD 331 according to control of the CO control unit 310.

The CO input unit 335 detects an operation on a touch sensor 336 and a switch 337, and outputs operation data indicating the detected operation to the CO control unit 310. The touch sensor 336 is superimposed and disposed on the surface of the LCD 331, and detects a contact operation and a pressing operation by the user U. The switch 337 is a hardware switch such as a power supply switch and a volume adjustment switch of the control device 300, for example.

A battery 341, a communication unit 342, and an I/F unit 343 are connected to the CO control unit 310.

The battery 341 is a secondary battery built in the main body of the control device 300, and supplies power to each component of the control device 300. The battery 341 may include a control circuit (not illustrated) configured to control power output and charging to the secondary battery.

The communication unit 342 complies with a wireless communication protocol such as Bluetooth and Wi-Fi, and performs wireless communication with a device outside the display system 1. Bluetooth and Wi-Fi are a registered trademark. The communication unit 342 may be configured to perform mobile data communication by using a mobile communication network such as LTE and a fifth generation mobile communication system. LTE is a registered trademark.

The I/F unit 343 includes a connector (not illustrated) connected to a data communication cable, and an interface circuit configured to execute a communication protocol conforming to various communication standards by the connector. For example, the I/F unit 343 includes a connector and an interface circuit conforming to the USB standard, and transmits and receives data through the USB cable 46. The I/F unit 343 corresponds to an example of a connection unit of the present disclosure.

In the present exemplary embodiment, the control device 300 transmits video data to the HMD 100 via the I/F unit 343, and receives detection data of the sensor from the HMD 100. The control device 300 supplies power to the HMD 100 via the I/F unit 343.

A configuration in which the I/F unit 343 in the present exemplary embodiment includes a USB interface, and the control device 300 transmits and receives data to and from the HMD 100 by using the USB cable 46 connected to the I/F unit 343 is illustrated.

The control device 300 may perform wireless data communication with the HMD 100 by the communication unit 342, for example. In this case, the communication unit 342 corresponds to an example of the connection unit of the present disclosure.

5. Configuration of Software Platform

Figure 5:
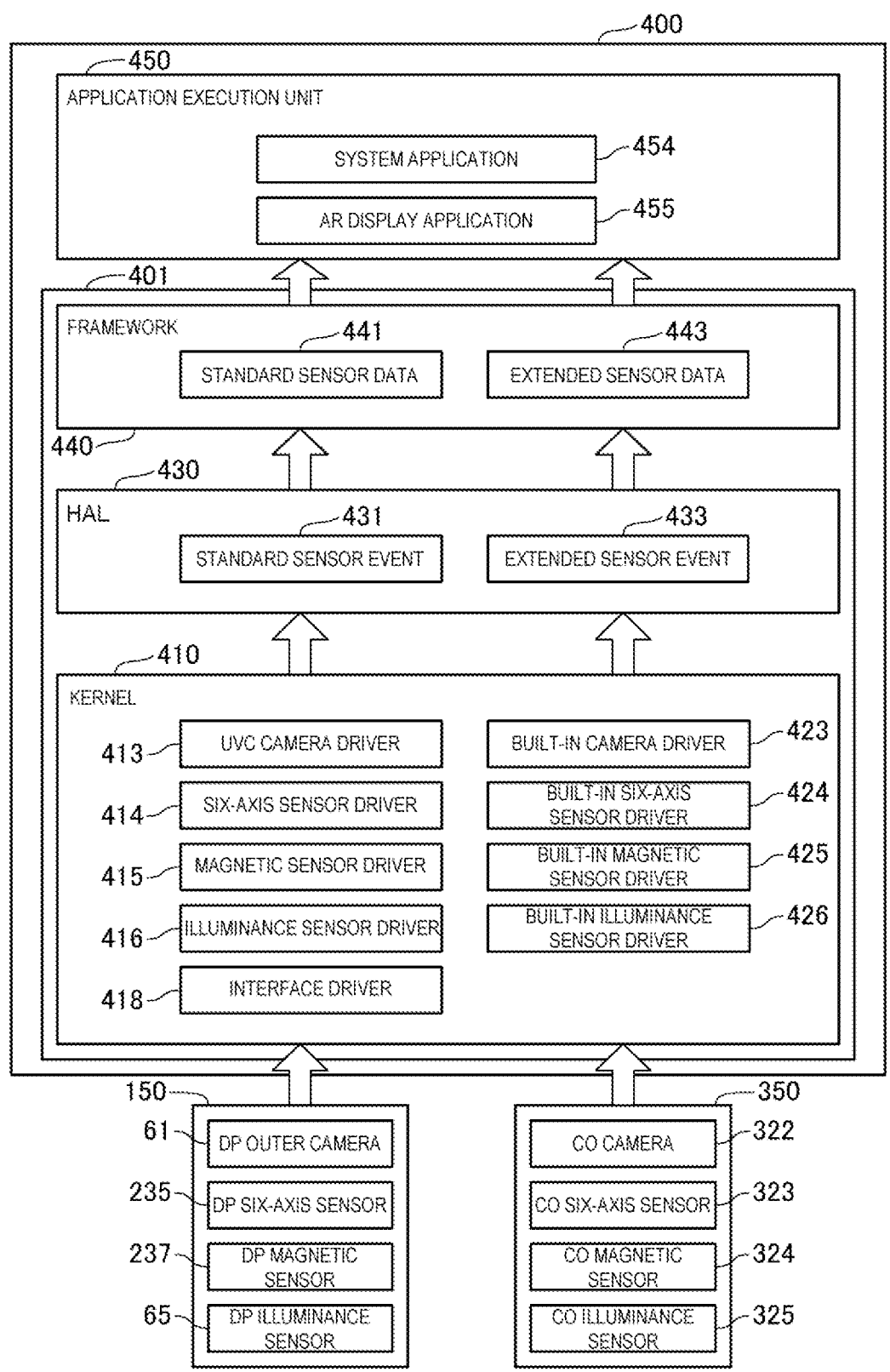
FIG. 5 is a schematic diagram illustrating a configuration of a software platform of the control device.

FIG. 5 is a schematic diagram illustrating a configuration of a software platform of the control device 300. The control device 300 constitutes a platform 400 configured to operate an application software by cooperation between hardware and software by the processor 311 executing the operating system.

The operating system executed by the processor 311 is formed of a file group including an execution file of a program executed by the processor 311, a data file to be processed by the program, and the like. The operating system of the control device 300 includes a general-purpose operating system such as Android, iOS, iPad OS, Windows, Mac OS, Linux, Unix, and Tron, for example. The operating system executed by the processor 311 may be acquired by changing a part of the general purpose operating system described above. Android, iOS, iPad, Windows, Linux, Unix, and Tron are a registered trademark. Mac is a trademark.

The platform 400 is configured to include many functional modules. FIG. 5 illustrates a part of the functional modules of the platform 400. Specifically, FIG. 5 illustrates a configuration of the platform 400 related to a function of acquiring and processing detection data from a first sensor group 350 included in the control device 300 and a second sensor group 150 included in the image display unit 20.

The first sensor group 350 includes at least some of the sensors included in the control device 300. The present exemplary embodiment gives an example in which the first sensor group 350 includes, for example, the CO camera 322, the CO six-axis sensor 323, the CO magnetic sensor 324, and the CO illuminance sensor 325. The second sensor group 150 includes at least some of the sensors included in the HMD 100. The present exemplary embodiment gives an example in which the second sensor group 150 includes the DP outer camera 61, the DP six-axis sensor 235, the DP magnetic sensor 237, and the DP illuminance sensor 65.

The first sensor group 350 and the second sensor group 150 preferably include sensors of the same type. The sensors of the same type refer to any of a common detection target, a common type of detection data to be output, and common information indicated by detection data. In a narrower sense, the sensors of the same type refer to a plurality of sensors including a common type of detection data and common information indicated by detection data. In the example in FIG. 5, the CO camera 322 and the DP outer camera 61 are the sensors of the same type. Similarly, the CO six-axis sensor 323 and the DP six-axis sensor 235 are the sensors of the same type, the CO magnetic sensor 324 and the DP magnetic sensor 237 are the sensors of the same type, and the CO illuminance sensor 325 and the DP illuminance sensor 65 are the sensors of the same type.

Various sensors included in the second sensor group 150 are connected to the platform 400 through the I/F unit 110, the USB cable 46, and the I/F unit 343.

The platform 400 is formed of a kernel 410, an HAL 430, a framework 440, and an application execution unit 450. The kernel 410, the HAL 430, and the framework 440 are realized by a function of the operating system executed by the processor 311. The operating system is configured to include one or a plurality of programs, pieces of data, libraries, runtime modules, and the like, and the processor 311 functions as the kernel 410, the HAL 430, and the framework 440 by the processor 311 executing or processing the one or plurality of programs, pieces of data, libraries, runtime modules, and the like.

The application execution unit 450 is configured by the processor 311 executing the operating system. The application execution unit 450 refers to a function of the processor 311 executing an application 451 by using an execution environment provided by the platform 400. In other words, main hardware constituting the application execution unit 450 is the processor 311, and the same applies to the kernel 410, the HAL 430, and the framework 440.

The kernel 410 is a function unit that realizes a basic function of the platform 400. The kernel 410 includes a driver that controls the hardware of the control device 300. The driver included in the kernel 410 corresponds to each type of hardware, for example.

As an example, in the platform 400 of Android OS, the kernel 410 is formed of a Linux kernel. The framework 440 corresponds to a Java framework, and may be realized by using an Android runtime module or a native library. Java is a registered trademark.

In the example illustrated in FIG. 5, the kernel 410 includes, as a driver configured to control hardware outside the control device 300, a UVC camera driver 413, a six-axis sensor driver 414, a magnetic sensor driver 415, and an illuminance sensor driver 416.

The UVC camera driver 413 is a driver configured to control a camera outside the control device 300, and controls the DP outer camera 61 and acquires captured imaging data output from the DP outer camera 61 as detection data. The six-axis sensor driver 414 is a driver configured to control a six-axis sensor outside the control device 300, and controls the DP six-axis sensor 235 and acquires detection data from the DP six-axis sensor 235. The six-axis sensor driver 414 may be divided into a driver configured to control the three-axis acceleration sensor and a driver configured to control the three-axis gyro sensor that are included in the DP six-axis sensor 235. The magnetic sensor driver 415 is a driver configured to control a magnetic sensor outside the control device 300, and controls the DP magnetic sensor 237 and acquires detection data from the DP magnetic sensor 237. The illuminance sensor driver 416 is a driver configured to control the illuminance sensor of the control device 300, and controls the DP illuminance sensor 65 and acquires detection data from the DP illuminance sensor 65. UVC is an abbreviation for USB Video Class and is an example of a device driver program for controlling a camera.

The kernel 410 includes, as a driver configured to control hardware included in the control device 300, a built-in camera driver 423, a built-in six-axis sensor driver 424, a built-in magnetic sensor driver 425, and a built-in illuminance sensor driver 426.

The built-in camera driver 423 controls the CO camera 322 built in the control device 300, and acquires captured imaging data output by the CO camera 322 as detection data. The built-in six-axis sensor driver 424 controls the CO six-axis sensor 323 built in the control device 300, and acquires detection data from the CO six-axis sensor 323. The built-in six-axis sensor driver 424 may be divided into a driver configured to control the three-axis acceleration sensor and a driver configured to control the three-axis gyro sensor that are included in the CO six-axis sensor 323. The built-in magnetic sensor driver 425 controls the CO magnetic sensor 324 built in the control device 300, and acquires detection data from the CO magnetic sensor 324. The built-in illuminance sensor driver 426 controls the CO illuminance sensor 325 built in the control device 300, and acquires detection data from the CO illuminance sensor 325.

The UVC camera driver 413, the six-axis sensor driver 414, the magnetic sensor driver 415, and the illuminance sensor driver 416 each acquire detection data at a preset timing. The same applies to the built-in camera driver 423, the built-in six-axis sensor driver 424, the built-in magnetic sensor driver 425, and the built-in illuminance sensor driver 426. Specifically, a sampling period for acquiring detection data is preset according to a type and specifications of the sensor, and each of the drivers described above acquires the detection data according to the sampling period.

In the following description, the platform 400 handles the sensor included in the second sensor group 150 as a standard sensor and the sensor included in the first sensor group 350 as an extended sensor. The control device 300 is connected to the HMD 100 and is designed as a device configured to execute processing related to the HMD 100. Thus, in the basic operation of the control device 300, processing based on detection data of the second sensor group 150 is executed, and the processing may also be executed by using detection data of the second sensor group 150 as data that substitute for the detection data of the first sensor group 350.

The standard sensor refers to a sensor preferentially used by the application 451 executed by the application execution unit 450 among sensors usable in the display system 1. The term "standard" included in the name refers to a sensor that is preferentially used or a sensor selected as a sensor that is used first, and does not refer to other meanings. For example, the term does not refer to a sensor that outputs a standard value. The extended sensor refers to a sensor that is selected next to the standard sensor. The term "extended" included in the name refers to a sensor that has a lower priority than that of the standard sensor, and does not refer to other meanings. For example, the extended sensor does not have a meaning limited to being installed in an extended state in the display system 1, but may be a sensor installed in the display system 1 in standard specifications.

Further, a standard sensor event described in the present exemplary embodiment is an event that occurs due to an output of a detection value by the standard sensor described above, and processing of a detection value and detection data of the standard sensor. Standard sensor data refer to a detection value and detection data of the standard sensor described above, or data acquired by processing the detection value and the detection data. The standard sensor event and the standard sensor data indicate an event and data related to a sensor used as the standard sensor, and thus include the term "standard" in the names, but there are no other intentions. For example, the standard sensor event and the standard sensor data are not limited to an event and data related to a standard value. Similarly, an extended sensor event and extended sensor data indicate an event and data related to a sensor used as the extended sensor, and thus include the term "extended", but there are no other intentions. For example, the extended sensor event and the extended sensor data are not limited to an event and data related to a sensor installed in an extended manner.

The kernel 410 includes an interface driver 418 configured to control the I/F unit 343. The interface driver 418 monitors a connection state of the I/F unit 343, and detects the insertion and removal of the USB cable 46 into and from the I/F unit 343.

The HAL 430 and the framework 440 function so as to pass data processed by the kernel 410 to the application execution unit 450. HAL is an abbreviation for Hardware Abstraction Layer.

The HAL 430 inputs and outputs data related to hardware control between the kernel 410 and the HAL 430. The HAL 430 requests control of the hardware from kernel 410, and acquires data acquired by the kernel 410. FIG. 5 illustrates a standard sensor event 431 and an extended sensor event 433 included in the HAL 430. The standard sensor event 431 acquires detection data of the standard sensor, and notifies the framework 440 of the detection data as an event related to the standard sensor. The extended sensor event 433 acquires detection data of the extended sensor, and notifies the framework 440 of the detection data as an event related to the extended sensor.

Specifically, the standard sensor event 431 acquires detection data of the standard sensor from the UVC camera driver 413, the six-axis sensor driver 414, the magnetic sensor driver 415, and the illuminance sensor driver 416. The extended sensor event 433 acquires detection data of the extended sensor from the built-in camera driver 423, the built-in six-axis sensor driver 424, the built-in magnetic sensor driver 425, and the built-in illuminance sensor driver 426. The number of the standard sensor event 431 and the extended sensor event 433 is not limited. The HAL 430 may generate a plurality of standard sensor events 431 and a plurality of extended sensor events 433 for each type of the sensor, which may be configured to simultaneously operate concurrently.

In the present exemplary embodiment, the HAL 430 operates on the upper layer of the kernel 410 as illustrated in FIG. 5, but a configuration varying depending on specifications of the operating system can be adopted as long as a function of a sensor data providing unit 401 for the application execution unit 450 is not different. For example, the HAL 430 may be mounted as middleware operating between the hardware and the kernel 410. In this case, the HAL 430 controls the hardware, and passes detection data acquired from the hardware to the kernel 410.

The framework 440 holds detection data of the standard sensor notified by the standard sensor event 431 as standard sensor data 441, and holds detection data of the extended sensor notified by the extended sensor event 433 as extended sensor data 443. These pieces of the standard sensor data 441 and the extended sensor data 443 are provided to the application execution unit 450. For example, when an application during execution requests captured imaging data of the camera, the framework 440 outputs the captured imaging data of the DP outer camera 61 held as the standard sensor data 441 to the application execution unit 450. For example, when an application during execution requests illumination data of a device different from the HMD 100, the framework 440 outputs the detection data of the CO illuminance sensor 325 held as the extended sensor data 443 to the application execution unit 450. The standard sensor data 441 correspond to an example of detection data of a first standard sensor. The extended sensor data 443 corresponds to an example of detection data of an extended sensor.

The number of pieces of the standard sensor data 441 and the extended sensor data 443 held by the framework 440 is not limited. The framework 440 may be configured to hold the standard sensor data 441 and the extended sensor data 443 for each type of the sensor, for example.

In the platform 400, the kernel 410, the HAL 430, and the framework 440 function as the sensor data providing unit 401 configured to provide the standard sensor data 441 and the extended sensor data 443 to the application 451. The sensor data providing unit 401 may provide the standard sensor data 441 and the extended sensor data 443 to the application execution unit 450, and the architecture illustrated in the drawing is an example.

The application execution unit 450 executes an application program installed in the control device 300. FIG. 5 illustrates a system application 454 and an AR display application 455 as an example of an application. The system application 454 is an application included as a basic function in the control device 300, and realizes functions such as a calendar, a clock, an alarm, a calculator, a telephone call, messaging, e-mail, camera photographing, and photo management. The system application 454 may include a web browser. The web browser displays a character, an images, video, and the like that constitute a Web page, and reproduces and outputs sound that constitutes the Web page.

The AR display application 455 realizes a function of displaying information related to an outside scene visually recognized through the image display unit 20 by the image display unit 20. For example, the AR display application 455 causes the user U wearing the image display unit 20 to visually recognize an image and a character related to an object present in the real space. AR is an abbreviation for Argument Reality that refers to an augmented reality.

The CO control unit 310 generates display data to be displayed by the image display unit 20 by executing the AR display application 455, and outputs the display data to the HMD 100 by the I/F unit 343. Further, the CO control unit 310 generates display control data for controlling display of the image display unit 20 by executing the AR display application 455, and outputs the display control data to the HMD 100 by the I/F unit 343. The display data may be video data or moving image data, and are, for example, video data in the HDMI format. The display data may be still image data, and may be data about a character and a symbol. The display control data is, for example, control data for setting display brightness and contrast of the image display unit 20.

The HMD 100 displays an image, video, or a character on the image display unit 20, based on the display data output by the control device 300. Further, the HMD 100 adjusts and changes a display state of the image display unit 20 according to the display control data output by the control device 300.

The application execution unit 450 is provided with the standard sensor data 441 and the extended sensor data 443 of the framework 440. The application execution unit 450 can request the standard sensor data 441 and the extended sensor data 443 from the framework 440, and the standard sensor data 441 and the extended sensor data 443 are provided in response to the request. Alternatively, an application operating on the application execution unit 450 can refer to the standard sensor data 441 and the extended sensor data 443.

In the present exemplary embodiment, the AR display application 455 uses detection data of the second sensor group 150 in order to acquire information related to an orientation of the image display unit 20 and an outside scene visually recognized by the user U through the image display unit 20. For example, the AR display application 455 detects an object from an outside scene visually recognized by the user U based on captured imaging data of the DP outer camera 61. The AR display application 455 specifies a distance from the image display unit 20 to the object, based on detection data of the distance sensor 64. Further, the AR display application 455 specifies a position and a direction of the object and the image display unit 20, based on detection data of the DP six-axis sensor 235 and the DP magnetic sensor 237. The position and the direction specified here may be a relative position and a relative direction of the object and the image display unit 20, and may be an absolute position and an absolute direction relative to the real space.

In a state where the control device 300 is connected to the HMD 100, an application executed by the application execution unit 450 can perform an operation based on detection data of the second sensor group 150. On the other hand, in a state where the control device 300 is not connected to the HMD 100, detection data of the second sensor group 150 cannot be acquired. The control device 300 in the present exemplary embodiment has functions of acquiring detection data of the first sensor group 350 as an alternative to detection data of the second sensor group 150, and operating an application. Hereinafter, an operation of the control device 300 will be described while a state where the control device 300 is connected to the HMD 100 is assumed to be a first state of the control device 300, and a state where the control device 300 is not connected to the HMD 100 is assumed to be a second state.

6. State of Control Device

Figure 6:
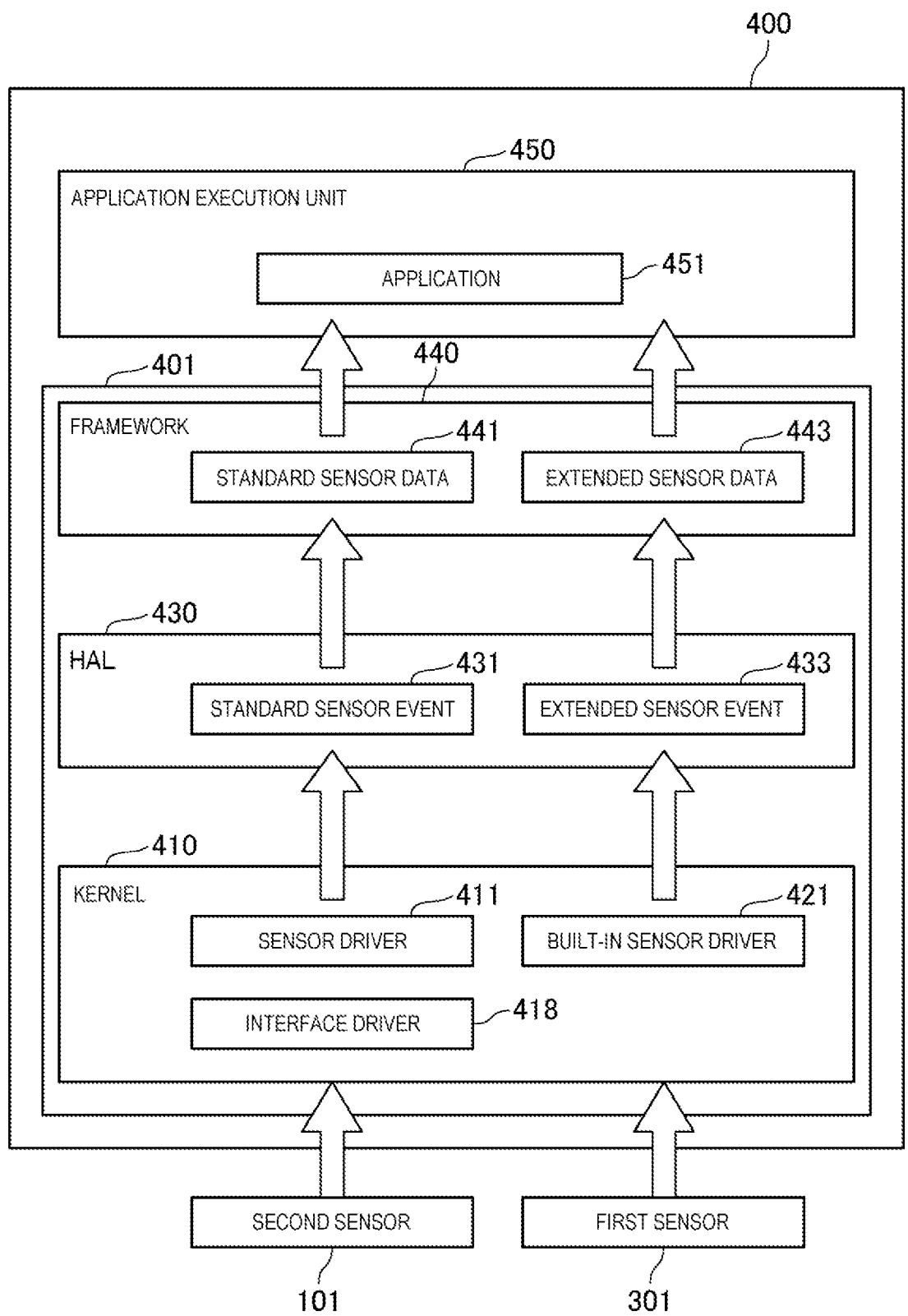
FIG. 6 is a schematic diagram of a platform in a first state of the control device.
Figure 7:
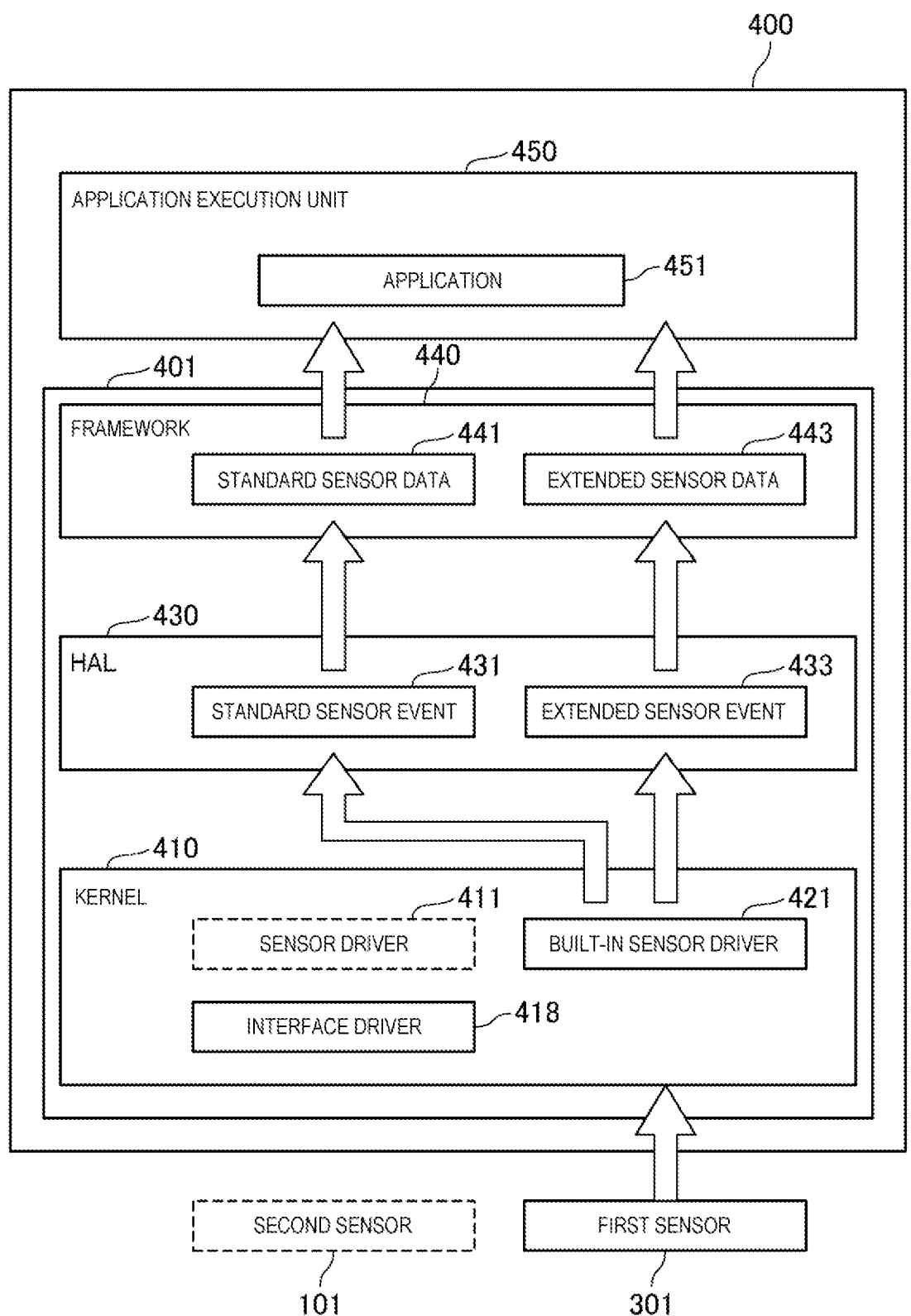
FIG. 7 is a schematic diagram of the platform in a second state of the control device.

FIG. 6 is a schematic diagram of the platform in the first state of the control device 300. FIG. 7 is a schematic diagram of the platform in the second state of the control device 300.

In FIGS. 6 and 7, any one or more sensors included in the second sensor group 150 are referred to as a second sensor 101, and any one or more sensors included in the first sensor group 350 are referred to as a first sensor 301.

A sensor driver 411 is a driver corresponding to the second sensor 101 among the UVC camera driver 413, the six-axis sensor driver 414, the magnetic sensor driver 415, the illuminance sensor driver 416, and the like. A built-in sensor driver 421 is a driver corresponding to the first sensor 301 among the built-in camera driver 423, the built-in six-axis sensor driver 424, the built-in magnetic sensor driver 425, the built-in illuminance sensor driver 426, and the like. The first sensor 301 and the second sensor 101 are sensors of the same type. The application 451 illustrated in the drawing is representative of an application executed by the application execution unit 450. The application 451 is the system application 454 or the AR display application 455 illustrated in FIG. 5, or an application of another type, and a function and a type of the application 451 are not limited.

The sensor driver 411 corresponds to an example of a second data acquisition unit, and the built-in sensor driver 421 corresponds to an example of a first data acquisition unit.

In the first state, the HMD 100 is connected to the I/F unit 343. Thus, the kernel 410 acquires detection data of the second sensor 101 by the sensor driver 411. The HAL 430 notifies the standard sensor event 431, and the framework 440 holds the standard sensor data 441. In this way, the sensor data providing unit 401 can provide the standard sensor data 441 and the extended sensor data 443 to the application execution unit 450. The application 451 can execute processing by using the detection data of the second sensor 101.

The kernel 410 acquires detection data of the first sensor 301 by the built-in sensor driver 421. The HAL 430 notifies the extended sensor event 433, based on the detection data of the first sensor 301, and the framework 440 holds the extended sensor data 443. In this way, the application 451 can also execute processing based on the detection data of the first sensor 301.

When the HMD 100 is not connected to the I/F unit 343, the platform 400 operates in the second state illustrated in FIG. 7. In the second state, the built-in sensor driver 421 outputs detection data of the first sensor 301 as detection data of the second sensor 101 to the HAL 430. Further, the built-in sensor driver 421 simultaneously outputs the detection data of the first sensor 301 as the detection data of the first sensor 301 to the HAL 430. In other words, the standard sensor event 431 and the extended sensor event 433 of the HAL 430 are generated based on the detection data of the first sensor 301 acquired by the built-in sensor driver 421. The framework 440 holds the standard sensor data 441 and the extended sensor data 443, based on the standard sensor event 431 and the extended sensor event 433. Both of the standard sensor data 441 and the extended sensor data 443 are data based on the detection data of the first sensor 301.

In the second state, the second sensor 101 is not connected, but the sensor data providing unit 401 can provide the standard sensor data 441 and the extended sensor data 443 to the application execution unit 450. Thus, the application 451 can perform both of an operation based on the detection data of the second sensor 101 and an operation based on the detection data of the first sensor 301.

For example, when the USB cable 46 is removed from the I/F unit 343 in the first state where the HMD 100 is connected to the I/F unit 343, the sensor driver 411 cannot acquire detection data. Accordingly, the standard sensor event 431 is not notified, and the standard sensor data 441 are not updated. Therefore, the application 451 is brought into a state where the standard sensor data 441 cannot be acquired or an operation based on the standard sensor data 441 cannot be normally performed. In this case, the application 451 needs to detect that the HMD 100 is removed and switch from an operation using the standard sensor data 441 to an operation using the extended sensor data 443. Such switching requires processing in multiple stages and takes time, and thus the operation of the application 451 is temporarily suspended. Further, when the application 451 does not have the function of switching from the standard sensor data 441 to the extended sensor data 443, the operation of the application 451 is more significantly suspended. A similar event may occur when communication between the HMD 100 and the control device 300 is interrupted, which is not limited to the case where the USB cable 46 is removed.

The function of the platform 400 causes the control device 300 in the present exemplary embodiment to transition to the second state when the HMD 100 is removed from the I/F unit 343, and the standard sensor event 431 is notified based on detection data of the first sensor 301. Thus, an operation can transition to an operation using the detection data of the first sensor 301 without interrupting the operation of the application 451. Therefore, the application 451 can be stably operated regardless of specifications of the application 451 as long as the application 451 is compatible with the platform 400.

In this way, the platform 400 operates in the first state or the second state depending on whether the HMD 100 is connected to the I/F unit 343. Further, when the interface driver 418 detects that the HMD 100 is not connected to the I/F unit 343, the platform 400 transitions to the second state illustrated in FIG. 7. When it is detected that the HMD 100 is connected to the I/F unit 343 in the second state, the platform 400 transitions to the first state. The transition from the first state to the second state and vice versa may be performed by the function of the kernel 410, or may be performed by the function of the operating system including the kernel 410.

The application execution unit 450 may determine whether the standard sensor data 441 are detection data of the first sensor 301 or detection data of the second sensor 101. The determination may be determined based on, for example, whether the sensor data providing unit 401 is in the first state or the second state. Alternatively, the sensor data providing unit 401 may notify the application execution unit 450 of whether the standard sensor data 441 are detection data of the first sensor 301 or detection data of the second sensor 101. The application execution unit 450 may notify the application 451 of a determination result, and generate display data or display control data for displaying the determination result on the image display unit 20 by the function of the application 451. In this case, for example, a character and an image of a message guiding that the HMD 100 is not connected to the control device 300 are displayed on the image display unit 20. In this way, the user U can be notified that the HMD 100 is not connected. For example, when the HMD 100 is removed from the control device 300 against an intention of the user U, the user U can be notified.

7. Operation of Control Device

Figure 8:
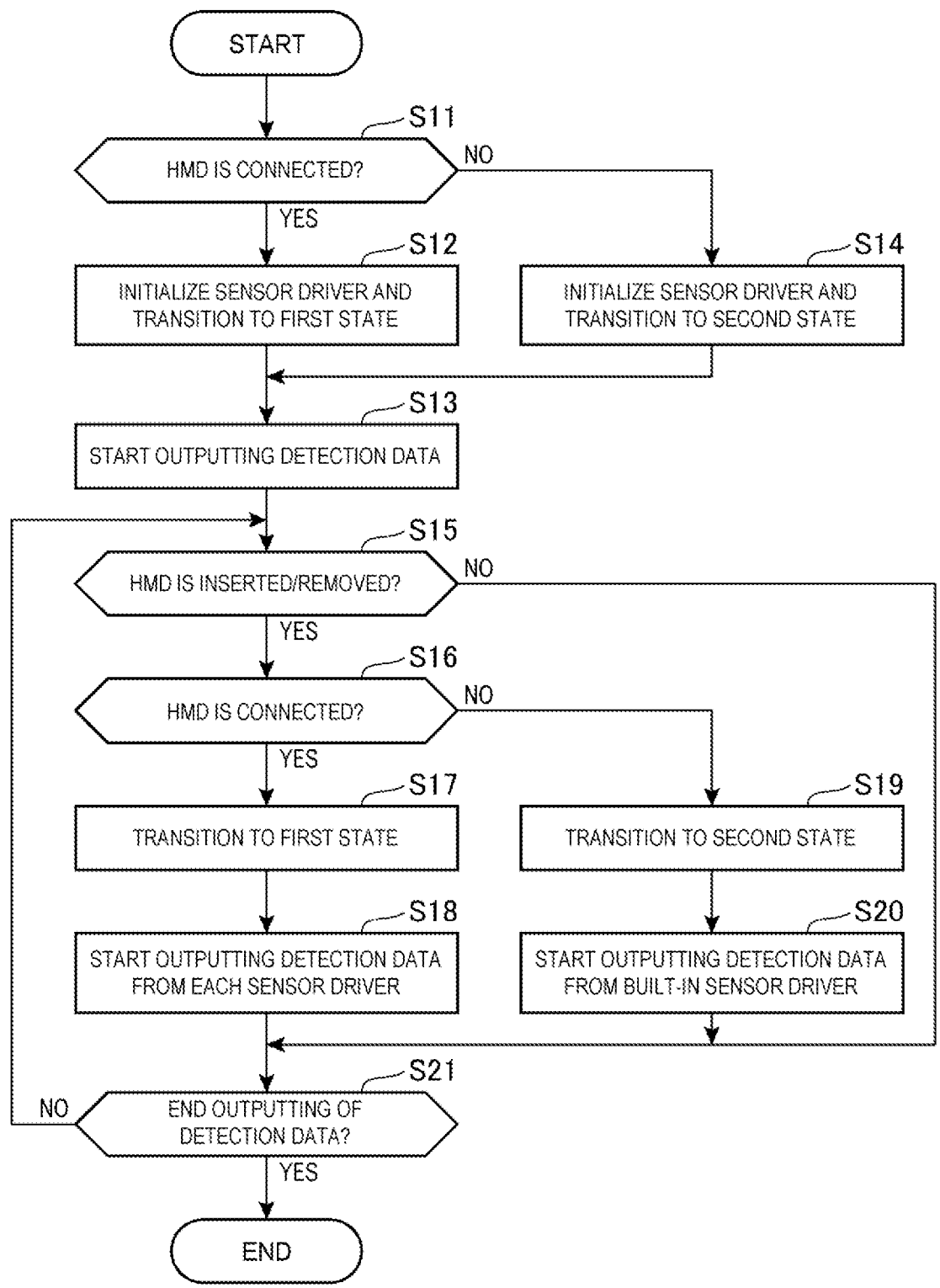
FIG. 8 is a flowchart illustrating an operation of the control device.

FIG. 8 is a flowchart illustrating the operation of the control device 300, and illustrates a state change of the platform 400 according to a connection state of the HMD 100 with respect to the control device 300. The operation illustrated in FIG. 8 is performed by the CO control unit 310, and is performed by, for example, the kernel 410. The operation in FIG. 8 starts at a timing at which the platform 400 starts acquiring and outputting detection data, such as when the control device 300 is activated.

The CO control unit 310 determines whether the HMD 100 is connected to the I/F unit 343 by the function of the interface driver 418 (step S11). When it is determined that the HMD 100 is connected (step S11; YES), the sensor driver 411 and the built-in sensor driver 421 of the kernel 410 are initialized, and the platform 400 is brought into the first state (step S12). Subsequently, outputting of detection data of the second sensor 101 and the first sensor 301 starts (step S13).

On the other hand, when it is determined that HMD 100 is not connected to the I/F unit 343 (step S11; NO), the built-in sensor driver 421 of the kernel 410 is initialized, and the platform 400 is brought into the second state (step S14). Subsequently, outputting of detection data of the first sensor 301 starts (step S13).

The CO control unit 310 monitors a connection state of the I/F unit 343 and the HMD 100, and determines whether the HMD 100 is attached to or detached from the I/F unit 343 (step S15). For example, the CO control unit 310 determines whether the USB cable 46 is inserted into or removed from the I/F unit 343.

When it is determined that the HMD 100 is attached or detached (step S15; YES), the CO control unit 310 determines whether the HMD 100 is connected to the I/F unit 343 (step S16). In step S16, the CO control unit 310 makes a determination by, for example, the number of times acquisition of the detection data of the second sensor 101 fails successively. Specifically, when acquisition of the detection data of the second sensor 101 fails successively a set number of times, it is determined that the HMD 100 is not connected. Further, when acquisition of the detection data of the second sensor 101 is successively successful a plurality of times, the CO control unit 310 determines that the HMD 100 is connected. The number of successful times and the number of unsuccessful times that are a reference for the determination are preset.

When it is determined that the HMD 100 is connected (step S16; YES), it means that the HMD 100 that has not been connected by then is newly connected. In this case, the CO control unit 310 transitions to the first state (step S17). In the platform 400, the sensor driver 411 of the kernel 410 is initialized, and the sensor driver 411 and the built-in sensor driver 421 start outputting the detection data (step S18).

When it is determined that the HMD 100 is not connected (step S16; NO), it means that the HMD 100 that has been connected by then is removed. In this case, the CO control unit 310 transitions to the second state (step S19). In the platform 400, the built-in sensor driver 421 of the kernel 410 starts outputting the detection data (step S20).

After outputting of the detection data starts in step S18 and step S20, the CO control unit 310 proceeds to step S21. Further, when it is determined in step S15 that the HMD 100 is not attached or detached (step S15; NO), the CO control unit 310 proceeds to step S21. In step S21, the CO control unit 310 determines whether to end outputting of the detection data (step S21). When outputting of the detection data ends (step S21; YES), such as when the control device 300 is shut down, the CO control unit 310 ends the present processing. Further, when outputting of the detection data does not end (step S21; NO), the CO control unit 310 returns to step S15.

Although FIG. 8 illustrates an example in which all the steps are performed in the flow control for convenience of understanding, the exemplary embodiments of the disclosure are not limited to this, and some operations may be performed by interrupt control. For example, the CO control unit 310 may perform step S16 by interrupt control when attachment/detachment of the HMD 100 is detected.

8. Other Exemplary Embodiment

In the present exemplary embodiment, an example in which detection data of one second sensor 101 and one first sensor 301 are processed is described with reference to FIGS. 6 and 7, but a plurality of sensors in the second sensor group 150 and the first sensor group 350 can also be, of course, used.

A specific example will be described with reference to FIGS. 9 and 10.

Figure 9:
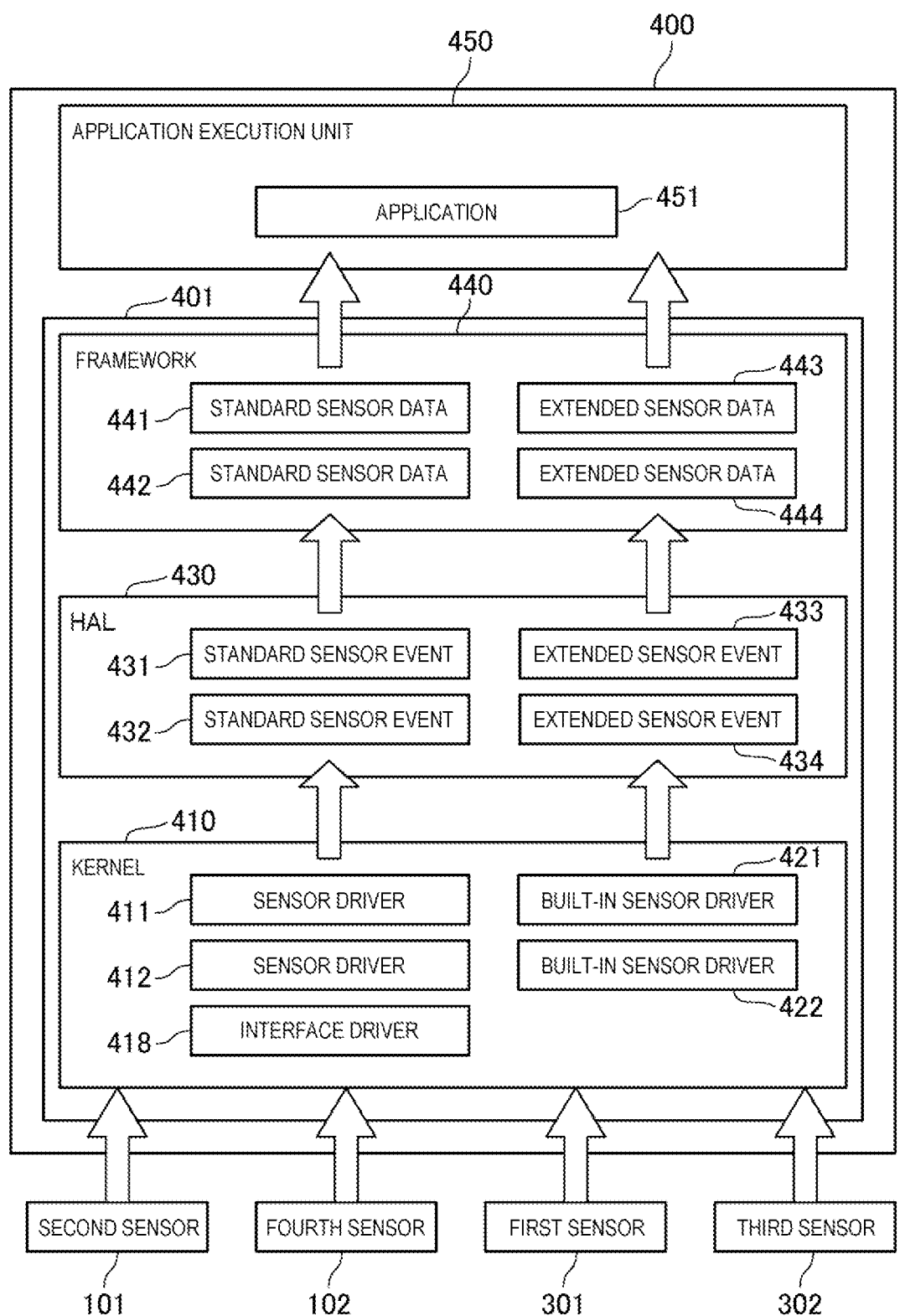
FIG. 9 is a schematic diagram of the platform in the first state of the control device.

FIG. 9 is a schematic view of the platform in the first state of the control device 300. FIG. 10 is a schematic view of the platform in the second state of the control device 300. In the following description, a configuration common to the configuration illustrated in FIGS. 6 and 7 is denoted by the same reference sign, and description thereof will be omitted.

Figure 10:
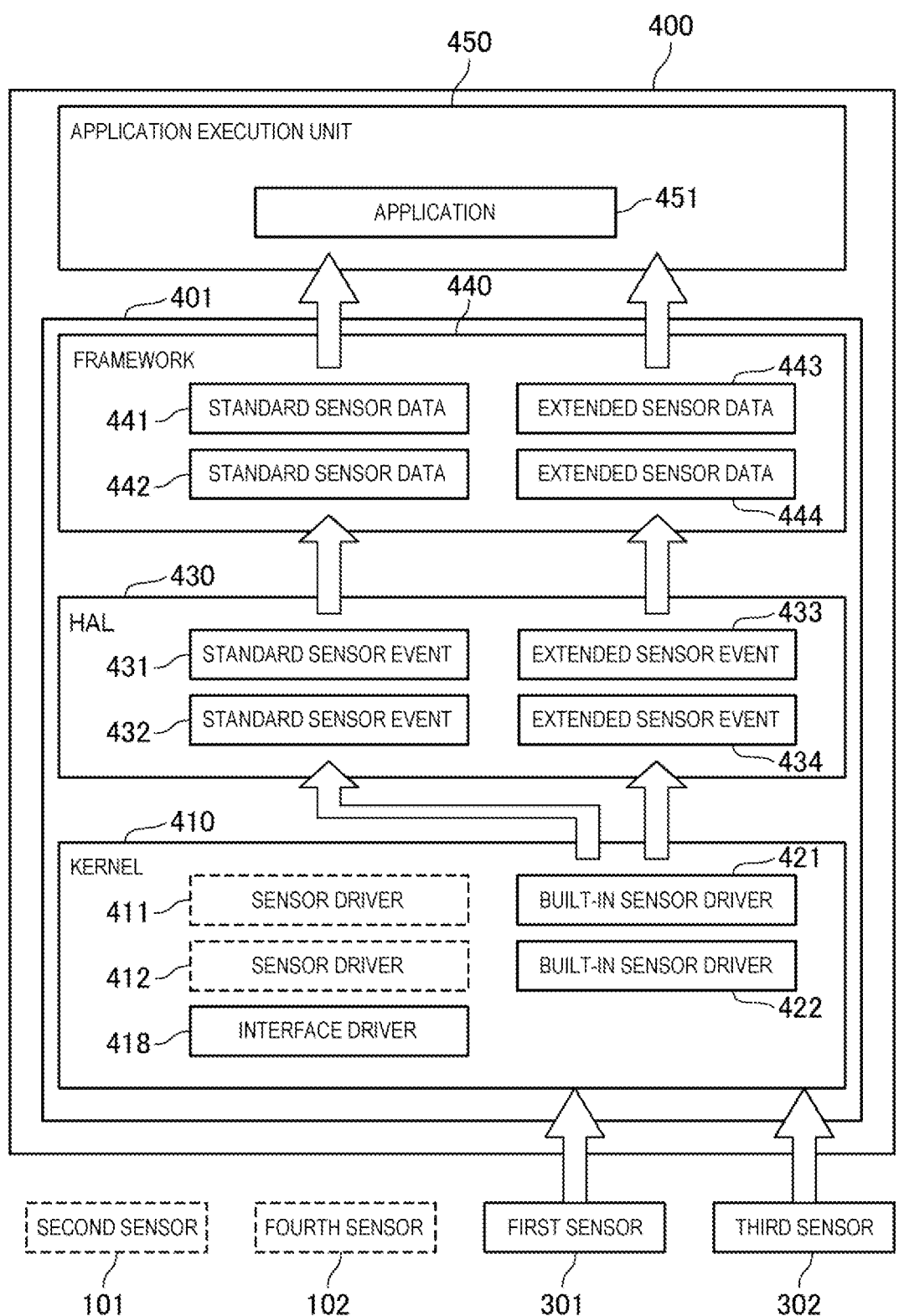
FIG. 10 is a schematic diagram of the platform in the second state of the control device.

In the example in FIGS. 9 and 10, it is assumed that two of the sensors included in the second sensor group 150 are the second sensor 101 and a fourth sensor 102. It is assumed that two sensors in the first sensor group 350 are the first sensor 301 and a third sensor 302. The first sensor 301 and the second sensor 101 are sensors of the same type, and the third sensor 302 and the fourth sensor 102 are sensors of the same type.

For example, when the second sensor 101 is the DP outer camera 61 and the fourth sensor 102 is the DP six-axis sensor 235, the first sensor 301 is the CO camera 322 and the third sensor 302 is the CO six-axis sensor 323. This combination is an example, and it is of course possible to combine other types of sensors.

In the kernel 410, the sensor driver 411 configured to control the second sensor 101 and a sensor driver 412 configured to control the fourth sensor 102 operate. Further, the built-in sensor driver 421 configured to control the first sensor 301 and a built-in sensor driver 422 configured to control the third sensor 302 operate.

The sensor driver 412 corresponds to an example of a fourth data acquisition unit, and the built-in sensor driver 422 corresponds to an example of a third data acquisition unit.

In the HAL 430, in addition to the standard sensor event 431 and the extended sensor event 433, a standard sensor event 432 and an extended sensor event 434 are generated. The standard sensor event 432 is an event based on detection data acquired from the fourth sensor 102 by the sensor driver 412. The extended sensor event 434 is an event based on detection data acquired from the third sensor 302 by the built-in sensor driver 422.

The framework 440 holds a standard sensor data 442 and an extended sensor data 444 in addition to the standard sensor data 441 and the extended sensor data 443. The standard sensor data 442 correspond to an example of detection data of a second standard sensor.

The standard sensor data 442 are data based on detection data notified by the standard sensor event 432. The extended sensor data 444 are data based on detection data notified by the extended sensor event 434.

The sensor data providing unit 401 can provide four pieces of data of the standard sensor data 441 and 442 and the extended sensor data 443 and 444 to the application 451 executed by the application execution unit 450. In other words, the application 451 can use the standard sensor data 441 and 442 as data of sensors included in the HMD 100. Further, the extended sensor data 443 and 444 that are detection data of the sensors included in the control device 300 can be used as necessary.

In the first state illustrated in FIG. 9, as described above, the HMD 100 is connected to the I/F unit 343, and thus the sensor drivers 411 and 412 can acquire detection data from the second sensor 101 and the fourth sensor 102, respectively.

In the second state illustrated in FIG. 10 similarly to the state illustrated in FIG. 6, the kernel 410 cannot acquire detection data from the second sensor 101 and the fourth sensor 102. Thus, the sensor drivers 411 and 412 cannot perform the operation of outputting the detection data to the HAL 430.

In this case, the built-in sensor driver 421 outputs detection data acquired from the first sensor 301 to the standard sensor event 431 and the extended sensor event 433. Similarly, the built-in sensor driver 422 outputs detection data acquired from the third sensor 302 to the standard sensor event 432 and the extended sensor event 434.

This operation causes the HAL 430 to notify the framework 440 of the detection data by the standard sensor events 431 and 432 and update the standard sensor data 441 and 442 held by the framework 440. Therefore, the sensor data providing unit 401 can provide the standard sensor data 441 and 442 to the application execution unit 450 even in a state where the detection data cannot be acquired from the second sensor 101 and the fourth sensor 102.

FIGS. 9 and 10 illustrate the example of using two sensors from each of the second sensor group 150 and the first sensor group 350, but the number of sensors used by the sensor data providing unit 401 is not limited. The number of sensors to be used can be appropriately changed according to a hardware configuration of the HMD 100 and the control device 300, specifications of the platform 400, and specifications of the application 451.

9. Action and Effect of Exemplary Embodiment

As described above, the control device 300 according to the exemplary embodiment to which the present disclosure is applied includes the first sensor 301, and the I/F unit 343 connected to the HMD 100 including the second sensor 101 and the image display unit 20. The control device 300 includes the application execution unit 450 configured to execute the application 451 using detection data of a sensor, and the sensor data providing unit 401 configured to provide the standard sensor data 441 to the application execution unit 450. The sensor data providing unit 401 includes the built-in sensor driver 421 configured to acquire detection data from the first sensor 301, and the sensor driver 411 configured to acquire detection data from the second sensor 101. When the HMD 100 is connected to the I/F unit 343, the detection data acquired by the sensor driver 411 is provided as the standard sensor data 441, and an operation of acquiring detection data of the first sensor 301 by the built-in sensor driver 421 continues. When the HMD 100 is not connected to the I/F unit 343, the detection data acquired by the built-in sensor driver 421 is provided as the standard sensor data 441.

The display system 1 includes the control device 300 including the first sensor 301, and the HMD 100 including the second sensor 101 and the image display unit 20. The control device 300 includes the first sensor 301, and the I/F unit 343 connected to the HMD 100 including the second sensor 101 and the image display unit 20. The control device 300 includes the application execution unit 450 configured to execute the application 451 using detection data of a sensor, and the sensor data providing unit 401 configured to provide the standard sensor data 441 to the application execution unit 450. The sensor data providing unit 401 includes the built-in sensor driver 421 configured to acquire detection data from the first sensor 301, and the sensor driver 411 configured to acquire detection data from the second sensor 101. When the HMD 100 is connected to the I/F unit 343, the detection data acquired by the sensor driver 411 is provided as the standard sensor data 441, and an operation of acquiring detection data of the first sensor 301 by the built-in sensor driver 421 continues. When the HMD 100 is not connected to the I/F unit 343, the detection data acquired by the built-in sensor driver 421 is provided as the standard sensor data 441. The HMD 100 performs display on the image display unit 20 according to display data or display control data input from the control device 300.

The display system 1 performs a data processing method using the control device 300 including the first sensor 301, and the HMD 100 including the second sensor 101 and the image display unit 20. In the data processing method, the control device 300 executes the application 451 using detection data of a sensor. Further, the standard sensor data 441 is provided to the application, based on data acquired by the built-in sensor driver 421 configured to acquire detection data of the first sensor 301 and the sensor driver 411 configured to acquire detection data of the second sensor 101. When the HMD 100 is connected to the control device 300, the detection data acquired by the sensor driver 411 is provided as the standard sensor data 441, and an operation of acquiring detection data of the first sensor 301 by the built-in sensor driver 421 continues. When the HMD 100 is not connected to the control device 300, the detection data acquired by the built-in sensor driver 421 is provided as the standard sensor data 441.

In this way, in either of the case where the HMD 100 is connected to the control device 300 and the case where the HMD 100 is not connected, the standard sensor data 441 can be provided to the application 451 that operates in the application execution unit 450. When the HMD 100 is not connected, the detection data acquired by the built-in sensor driver 421 from the first sensor 301 is provided as the standard sensor data 441. Therefore, the data provided to the application 451 can be quickly switched according to presence or absence of the connection of the HMD 100 to the control device 300 without requiring an instruction from the user.

For example, even when the sensor driver 411 cannot acquire detection data, such as when the HMD 100 is removed from the control device 300, the standard sensor data 441 can be provided. Particularly, since the built-in sensor driver 421 continues processing of acquiring detection data of the first sensor 301, the built-in sensor driver 421 can quickly start processing of outputting the detection data to the HAL 430. Thus, when the HMD 100 is removed, the sensor driver 411 can be output in a shorter period of time than that when processing of newly activating a driver of the kernel 410 and switching detection data is performed. Therefore, an interruption time of provision of the standard sensor data 441 to the application 451 can be shortened, or an interruption of provision can be avoided.

In the control device 300, the sensor data providing unit 401 outputs the detection data acquired by the built-in sensor driver 421 as the extended sensor data 443 to the application execution unit 450. This operation is performed in either of the case where the HMD 100 is connected to the I/F unit 343 and the case where the HMD 100 is not connected to the I/F unit 343. In this way, the standard sensor data 441 and the extended sensor data 443 can be provided to the application 451. Furthermore, the detection data of the first sensor group 350 can be quickly provided as the standard sensor data 441 when the detection data cannot be acquired from the second sensor group 150. Thus, the data provided to the application 451 can be quickly switched according to presence or absence of the connection of the HMD 100 to the control device 300. Furthermore, when the HMD 100 is removed, and the like, an interruption time of provision of the standard sensor data 441 to the application 451 may be shortened, or an interruption of provision can be avoided.

In the display system 1, the first sensor 301 and the second sensor 101 are sensors of the same type. The sensor data providing unit 401 acquires detection data from the first sensor 301 and the second sensor 101 that are sensors of the same type. Thus, the sensor data providing unit 401 can provide the detection data acquired from the first sensor 301 as the standard sensor data 441. Therefore, the data provided to the application 451 can be quickly switched according to presence or absence of the connection of the HMD 100 to the control device 300 without requiring an instruction from the user.

The sensor data providing unit 401 acquires the detection data of the second sensor 101 in a period preset by the sensor driver 411. The sensor data providing unit 401 detects that the HMD 100 is connected to the I/F unit 343 when the detection data of the second sensor 101 is successively acquired. In this way, it is possible to quickly detect that the HMD 100 is connected to the control device 300.

The sensor data providing unit 401 acquires the detection data of the second sensor 101 in a period preset by the sensor driver 411. The sensor data providing unit 401 detects that the HMD 100 is not connected to the I/F unit 343 when acquisition of detection data of the second sensor 101 fails successively a set number of times. In this way, it is possible to quickly detect that the HMD 100 is no longer connected to the control device 300.

The I/F unit 343 can output, to the HMD 100, display data displayed by the image display unit 20 or display control data for controlling display of the image display unit 20. The application execution unit 450 executes processing of generating the display data or the display control data, based on the standard sensor data 441. In this way, in the processing of controlling display of the image display unit 20, based on the detection data provided by the sensor data providing unit 401, the data can be switched in a short period of time according to presence or absence of the connection of the HMD 100. Therefore, when the HMD 100 is removed, and the like, a disturbance in display on the image display unit 20 can be suppressed or avoided.

The application execution unit 450 may determine whether the standard sensor data 441 are detection data of the first sensor 301 or detection data of the second sensor 101, and may generate the display data or the display control data for displaying a determination result on the image display unit 20. In this case, the user can be notified whether the sensor used for controlling the display of the image display unit 20 is the second sensor 101 or the first sensor 301. Thus, the user can know that, for example, the HMD 100 is removed from the control device 300 and the like against an intention of the user.

Further, as illustrated in FIGS. 9 and 10, the control device 300 may be configured to include the third sensor 302. In this configuration, the sensor data providing unit 401 may include the built-in sensor driver 422 configured to acquire detection data of the third sensor 302 and the sensor driver 412 configured to acquire detection data of the fourth sensor 102 via the I/F unit 343. Here, when the HMD 100 is connected to the I/F unit 343, the detection data acquired by the sensor driver 412 is provided as the standard sensor data 442, and an operation of acquiring detection data of the third sensor 302 by the built-in sensor driver 422 continues. When the HMD 100 is not connected to the I/F unit 343, the detection data acquired by the third data acquisition unit is provided as the standard sensor data 442. According to the configuration, in either of the case where the HMD 100 is connected to the control device 300 and the case where the HMD 100 is not connected, the standard sensor data 441 and 442 of the plurality of sensors can be provided to the application 451. Then, the data provided to the application 451 can be quickly switched according to presence or absence of the connection of the HMD 100 to the control device 300 without requiring an instruction from the user. Therefore, even when the sensor drivers 411 and 412 cannot acquire detection data, an interruption time of provision of the standard sensor data 441 and 442 can be shortened, or an interruption of provision can be avoided.

The present disclosure is not limited to the configurations described in the exemplary embodiment described above, and the present disclosure can be implemented in various aspects without departing from the gist of the present disclosure.

For example, a configuration in which the display system 1 includes the HMD 100 being a head-mounted display apparatus is illustrated, but the present disclosure is not limited thereto, and various types of display devices can be adopted. Further, a target sensor from which the control device 300 acquires detection data by the built-in sensor drivers 421 and 422 is not limited to a sensor built in the control device 300, and may be an external sensor connected to the control device 300. For example, the target sensor may be a camera or a sensor included in a wearable device mounted on an arm, a leg, a trunk, or the like of the user U.

For example, instead of the image display unit 20, for example, another type of image display unit such as an image display unit to be worn like a cap, for example, may be adopted. Such an image display unit may include a display unit configured to display an image corresponding to the left eye LE of the user U and a display unit configured to display an image corresponding to the right eye RE of the user U. Additionally, the display device in the present disclosure may be configured, for example, as a head mounted display mounted on a vehicle such as a car, and an airplane. Further, the display device may be configured, for example, as a head-mounted display built into a body protector tool such as a helmet. In such a case, a portion for positioning the apparatus with respect to the body of the user U, and a portion positioned with respect to the portion described earlier can be a mounting portion of the head-mounted display apparatus.

The HMD 100 is an example of a display device to which the present disclosure is applied, and is not limited to the configuration illustrated in FIG. 3. For example, the configuration in which the image display unit 20 and the connection device 10 are separated is described as an example in the exemplary embodiment described above, but a configuration in which the connection device 10 and the image display unit 20 are integrally formed and mounted on a head of the user U can also be adopted. Further, the configuration of the optical system of the image display unit 20 is optional, and, for example, an optical member located in front of the eye of the user U and overlapping a part or all of the field of view of the user U may be used. Alternatively, a scanning type optical system that sets imaging light by scanning laser light or the like may be adopted. Alternatively, the optical system is not limited to guiding imaging light inside the optical member, and may have only a function of refracting and/or reflecting the imaging light toward the eye of the user U.

Further, as the display device, a liquid crystal monitor or a liquid crystal television that displays an image on a liquid crystal display panel may be adopted. A display device including a plasma display panel or an organic EL display panel may be used. In this case, the display panel corresponds to a display unit of the present disclosure. Further, as the display device, a projector configured to project imaging light onto a screen or the like may be used.

For example, in the HMD 100 illustrated in FIG. 3, the connection device 10 may be formed by using a USB-Type C connector, a USB-Type C controller, and a USB hub. In this case, the DP outer camera 61 and the other sensors may be connected to the USB hub. Further, as a controller configured to control display of the right display unit 22 and the left display unit 24 in the image display unit 20, the FPGA configured to output display data to the right display unit 22 and the left display unit 24 may be disposed on either the right display unit 22 or the left display unit 24. In this case, the connection device 10 may include a bridge controller configured to connect the USB-Type C controller and the FPGA. Further, in the image display unit 20, the DP six-axis sensor 235, the DP magnetic sensor 237, the EEPROM 215, and the like may be mounted on the same substrate as the FPGA. The arrangement of the other sensors can also be appropriately changed. For example, the distance sensor 64 and the DP illuminance sensor 65 may be disposed in positions suitable for a measurement or detection, and may be connected to the FPGA or the USB-Type C controller.

Further, specific specifications of the display device including the OLED units 221 and 241 are also not limited, and, for example, the OLED units 221 and 241 may have a common configuration.

At least some of the functional blocks illustrated in FIGS. 3 and 4 may be achieved in the form of hardware or may be achieved by a cooperation of hardware and software, and, is not limited to a configuration in which independent hardware resources are arranged as illustrated in the drawings. Further, the program executed by the processor 311 may have a configuration in which a program stored in an external device is acquired via the communication unit 342 or the I/F unit 343 to be executed.

What is claimed is:

1. A data processing device, comprising:
   a first sensor;
   a connection unit connected to a head mounted display, the head mounted display including a second sensor and a display unit;
   an application execution unit executing an application that uses at least one of detection data of the first sensor and detection data of the second sensor; and
   a sensor data providing unit providing each of detection data of a first standard sensor and detection data of an extended sensor to the application execution unit, wherein
   the sensor data providing unit includes a first data acquisition unit that acquires detection data of the first sensor, and a second data acquisition unit that acquires detection data of the second sensor,
   when the head mounted display is connected to the connection unit, the sensor data providing unit always provides the detection data acquired from the second sensor of the head mounted display by the second data acquisition unit as detection data of the first standard sensor and always provides the detection data acquired from the first sensor by the first data acquisition unit as detection data of the extended sensor, and
   when the head mounted display is not connected to the connection unit, the sensor data providing unit provides the detection data acquired from the first sensor by the first data acquisition unit both detection data of the first standard sensor and as detection data of the extended sensor.

2. The data processing device according to claim 1, wherein
   the first sensor and the second sensor are sensors of a same type.

3. The data processing device according to claim 1, comprising
   a third sensor, wherein
   the sensor data providing unit includes a third data acquisition unit that acquires detection data of the third sensor, and a fourth data acquisition unit that acquires, via the connection unit, detection data of a fourth sensor included in the head mounted display,
   when the head mounted display is connected to the connection unit, the detection data acquired by the fourth data acquisition unit is provided as detection data of a second standard sensor, and an operation of acquiring detection data of the third sensor by the third data acquisition unit is continued, and,
   when the head mounted display is not connected to the connection unit, the detection data acquired by the third data acquisition unit is provided as detection data of the second standard sensor.

4. The data processing device according to claim 1, wherein
   the sensor data providing unit acquires detection data of the second sensor in a period preset by the second data acquisition unit, and detects that the head mounted display is connected to the connection unit when detection data of the second sensor is successively acquired.

5. The data processing device according to claim 1, wherein
the sensor data providing unit acquires detection data of the second sensor in a period preset by the second data acquisition unit, and detects that the head mounted display is not connected to the connection unit when acquisition of detection data of the second sensor fails successively a set number of times.

6. The data processing device according to claim 1, wherein
the connection unit outputs, to the head mounted display, display data displayed by the display unit or display control data for controlling display of the display unit, and
the application execution unit executes processing of generating the display data or the display control data, based on detection data of the first standard sensor.

7. The data processing device according to claim 6, wherein
the application execution unit determines whether detection data of the first standard sensor is detection data of the first sensor or detection data of the second sensor, and generates the display data or the display control data for displaying a determination result on the display unit.

8. A display system, comprising:
a data processing device including a first sensor; and
a head mounted display including a second sensor and a display unit, wherein
the data processing device includes
a connection unit connected to the head mounted display,
an application execution unit executing an application that uses at least one of detection data of the first sensor and detection data of the second sensor; and
a sensor data providing unit providing each of detection data of a first standard sensor and detection data of an extended sensor to the application execution unit,
the application execution unit executes the application configured to output, to the head mounted display, display data displayed by the display unit and display control data for controlling display of the display unit,
the sensor data providing unit includes a first data acquisition unit that acquires detection data of the first sensor, and a second data acquisition unit that acquires detection data of the second sensor,
when the head mounted display is connected to the connection unit, the sensor data providing unit always provides the detection data acquired from the second sensor of the head mounted display by the second data acquisition unit as detection data of the first standard sensor and always provides the detection data acquired from the first sensor by the first data acquisition unit as detection data of the extended sensor, and
when the head mounted display is not connected to the connection unit, the sensor data providing unit provides the detection data acquired from the first sensor by the first data acquisition unit both as detection data of the first standard sensor and as detection data of the extended sensor, and
the head mounted display performs display on the display unit according to the display data or the display control data input from the data processing device.

9. A data processing method using a data processing device including a first sensor, and a head mounted display including a second sensor and a display unit, the data processing method comprising:
by the data processing device,
executing an application that uses at least one of detection data of the first sensor and detection data of the second sensor;
providing each of detection data of a first standard sensor and detection data of an extended sensor to the application, based on data acquired by a first data acquisition unit that acquires detection data of the first sensor and data acquired by a second data acquisition unit that acquires detection data of the second sensor;
providing always, when the head mounted display is connected to the data processing device, the detection data acquired from the second sensor of the head mounted display by the second data acquisition unit as detection data of the first standard sensor and providing always the detection data acquired from the first sensor by the first data acquisition unit as detection data of the extended sensor; and
providing, when the head mounted display is not connected to the data processing device, the detection data acquired from the first sensor by the first data acquisition unit both of as detection data of the first standard sensor and as detection data of the extended sensor.

* * * * *